(12) United States Patent
Ishiguro

(10) Patent No.: US 8,350,999 B2
(45) Date of Patent: Jan. 8, 2013

(54) LIQUID-CRYSTAL DISPLAY DEVICE HAVING PARTICULAR RETARDATIONS AND INTERNAL HAZES

(75) Inventor: Makoto Ishiguro, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 224 days.

(21) Appl. No.: 12/956,157

(22) Filed: Nov. 30, 2010

(65) Prior Publication Data

US 2011/0128482 A1   Jun. 2, 2011

(30) Foreign Application Priority Data

Nov. 30, 2009  (JP) ................................ 2009-272820
Mar. 25, 2010  (JP) ................................ 2010-070128

(51) Int. Cl.
*G02F 1/1335* (2006.01)
*G02F 1/1337* (2006.01)
*C09K 19/02* (2006.01)

(52) U.S. Cl. .................... 349/117; 349/130; 349/181

(58) Field of Classification Search ............... 349/117, 349/130, 181
See application file for complete search history.

(56) References Cited

U.S. PATENT DOCUMENTS

| 7,982,826 | B2 * | 7/2011 | Hirakata et al. | 349/85 |
| 2011/0058131 | A1 * | 3/2011 | Ishiguro | 349/117 |
| 2011/0128473 | A1 * | 6/2011 | Ishiguro | 349/68 |

FOREIGN PATENT DOCUMENTS

JP    2007-133379 A    5/2007

\* cited by examiner

*Primary Examiner* — Mike Qi
(74) *Attorney, Agent, or Firm* — Sughrue Mion, PLLC

(57) ABSTRACT

The invention relates to a liquid-crystal display device comprising a front-side polarizing element, a rear-side polarizing element, a liquid-crystal cell, a front-side retardation region, and a rear-side retardation region composed of one or more retardation layers disposed between the rear-side polarizing element and the liquid-crystal cell wherein retardation along the thickness direction of the front-side retardation region and the rear-side retardation region, $Rth_{front}(\lambda)$, and $Rth_{rear}(\lambda)$, and the internal haze of the front-side retardation region and the rear-side retardation region, $Hz_{front}$ and $Hz_{rear}$, satisfy the following formula (1) or (2):

$$Rth_{front}(\lambda) > Rth_{rear}(\lambda), \text{ and } Hz_{front} < Hz_{rear}, \quad (1)$$

$$Rth_{front}(\lambda) < Rth_{rear}(\lambda), \text{ and } Hz_{front} > Hz_{rear}. \quad (2)$$

24 Claims, 1 Drawing Sheet

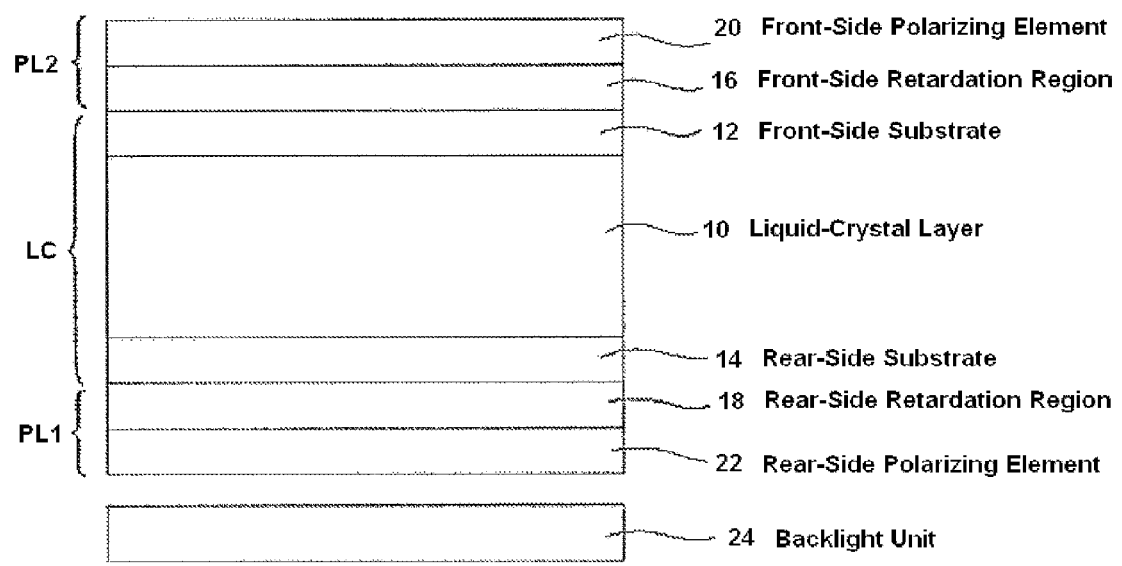

LIQUID-CRYSTAL DISPLAY DEVICE HAVING PARTICULAR RETARDATIONS AND INTERNAL HAZES

CROSS-REFERENCE TO RELATED APPLICATIONS

This application claims benefit of priority under 35 U.S.C. 119 to Japanese Patent Applications No. 2009-272820 filed on Nov. 30, 2009 and No. 2010-070128 filed on Mar. 25, 2010; and the entire contents of the application are incorporated herein by reference.

BACKGROUND OF THE INVENTION

1. Field of the Invention

The present invention relates to a VA (vertically aligned)-mode liquid-crystal display device improved in the front contrast ratio.

2. Background Art

These days elevation of the contrast ratio (CR) in liquid-crystal display devices is being promoted. In particular, a VA-mode liquid-crystal display device has the advantage that CR in the normal direction (hereinafter referred to as "front CR", and "front CR" may be generally called also as "on-axis contrast ratio") is high as compared with that in other modes, and various studies and developments are now made for further enhancing the advantage. As a result, in these 6 years, the front CR in VA-mode liquid-crystal display devices has increased from about 400 to about 8000, or by about 20 times.

The front CR is an important property that is to be the index of image sharpness, and a VA-mode LCD is characterized by high front CR and is now the mainstream of LCD panels.

On the other hand, in liquid-crystal display devices, it is important that not only the front CR is high but also the panel secures a broad viewing angle (that is, CR in oblique directions (hereinafter this may be referred to as "viewing angle CR") is high), and that the panel is free from color shift in oblique directions. For improving the viewing angle characteristics of liquid-crystal display devices, in general, a retardation film is disposed on the front side and the backside of the liquid-crystal cell.

For example, in a VA-mode liquid-crystal display device, in general, a retardation film is disposed each one on the front side and on the rear side, thereby distributing retardation necessary for viewing angle compensation into each one to compensate the viewing angle on the panel. There are known an embodiment where a film having the same retardation is disposed both on the front side and on the rear side (hereinafter this may be referred to as "both-sides retardation film type"); and an embodiment where an inexpensive film such as a plain TAC film or the like is disposed on any of the front side or the rear side, and a film having a large retardation is disposed on the other side (hereinafter this may be referred to as "one-sides retardation film type").

The former embodiment is advantageous in that one and the same retardation film can be used; and the latter embodiment is advantageous in that a popular film can be used on one side.

For increasing the front CR of a liquid-crystal display device, the haze of the retardation film to be used for viewing angle compensation is preferably lower (for example, JP-A 2007-133379). In particular, as described in the above, a VA-mode liquid-crystal display device has a higher front CR than liquid-crystal display devices of other modes, and the request for the device of preventing the front CR reduction to be caused by the retardation film therein is higher than that for liquid-crystal display devices of other modes.

Popular retardation films are inexpensive, and use of such popular films for retardation films is preferred for reducing the production cost of liquid-crystal display devices. On the other hand, for reducing the haze of retardation films, severe control of production conditions and limitation on additives and starting polymers are necessary, or that is, the haze reduction is accompanied by cost increase in some degree. Accordingly, almost all inexpensive popular retardation films are not processed for haze reduction, or that is, there are a lot of popular retardation films having a high haze.

The front CR of existing liquid-crystal display devices is low; and in these devices, even when popular retardation films are used and the front CR is reduced in some degree owing to the haze thereof, the degree of front CR reduction is small and is on an unrecognizable level. However, as described in the above, with the recent tendency toward higher-CR liquid-crystal display devices, even some slight influence to be caused of the haze of retardation films could appear as a significant change in the front CR.

SUMMARY OF THE INVENTION

An object of the present invention is to improve the front contrast ratio of a liquid-crystal display device having a retardation film for viewing angle compensation.

Another object of the invention is to further improve the front contrast ratio of a liquid-crystal display device having an advanced high contrast ratio.

Still another object of the invention is to provide a liquid-crystal display device that realizes suitable viewing angle compensation and has an improved front contrast ratio.

Still another object of the invention is to provide a low-cost liquid-crystal display device that realizes a high contrast ratio.

The means for achieving the objects are as follows.

[1] A liquid-crystal display device comprising:
a front-side polarizing element,
a rear-side polarizing element,
a liquid-crystal cell disposed between the front-side polarizing element and the rear-side polarizing element,
a front-side retardation region composed of one or more retardation layers disposed between the front-side polarizing element and the liquid-crystal cell, and
a rear-side retardation region composed of one or more retardation layers disposed between the rear-side polarizing element and the liquid-crystal cell, wherein:
retardation along the thickness direction at a visible light wavelength λ nm of the front-side retardation region and the rear-side retardation region, $Rth_{front}(\lambda)$ and $Rth_{rear}(\lambda)$, and the internal haze of the front-side retardation region and the rear-side retardation region, $Hz_{front}$ and $Hz_{rear}$, satisfy following formula (1) or (2):

$$Rth_{front}(\lambda) > Rth_{rear}(\lambda), \text{ and } Hz_{front} < Hz_{rear}. \quad (1)$$

$$Rth_{front}(\lambda) < Rth_{rear}(\lambda), \text{ and } Hz_{front} < Hz_{rear}. \quad (2)$$

[2] The liquid-crystal display device of [1], satisfying formula (1).

[3] The liquid-crystal display device of [1], satisfying formula (2).

[4] The liquid-crystal display device of any one of [1]-[3], wherein $Hz_{front}$ and $Hz_{rear}$ each are equal to or smaller than 0.6.

[5] The liquid-crystal display device of any one of [1]-[4], wherein the contrast ratio of the front-side substrate and the rear-side substrate of the liquid-crystal cell, CR(front) and CR(rear) satisfy the following formula:

CR(rear)≦CR(front).

[6] The liquid-crystal display device of [5], wherein the rear-side substrate of the liquid-crystal cell is an array substrate having a black matrix to partition pixels provided with a color filter layer.

[7] The liquid-crystal display device of any one of [1]-[4], wherein the contrast ratio of the front-side substrate and the rear-side substrate of the liquid-crystal cell, CR(front) and CR(rear) satisfy the following formula:

CR(front)<CR(rear).

[8] The liquid-crystal display device of [7], wherein the front-side substrate of the liquid-crystal cell is an array substrate having a black matrix to partition pixels provided by a color filter layer.

[9] The liquid-crystal display device of any one of [1]-[8], wherein the rear-side retardation region satisfies the following formula:

0 nm≦|Rth(550)|≦300 nm, wherein Rth(λ) means retardation along the thickness-direction (nm) at a wavelength of λ nm.

[10] The liquid-crystal display device of any one of [1]-[9], wherein the rear-side retardation region satisfies the following formula:

0 nm≦Re(550)≦100 nm, wherein Re(λ) means the in-plane retardation (nm) at a wavelength of λ nm.

[11] The liquid-crystal display device of any one of [1]-[10], wherein the front-side retardation region satisfies the following formula:

0 nm≦|Rth(550)|≦300 nm.

[12] The liquid-crystal display device of any one of [1]-[11], wherein the front-side retardation region satisfies the following formula:

0 nm≦Re(550)≦100 nm.

[13] The liquid-crystal display device of any one of [1]-[12], wherein Rth(550) of the rear-side retardation region and/or the front-side retardation region satisfies the following two formulas:

|Rth(450)|/|Rth(550)|≦1, and

1≦|Rth(630)|/|Rth(550)|.

[14] The liquid-crystal display device of any one of [1]-[13], comprising a color filter disposed inside the liquid crystal cell, wherein Rth of the color filter layer satisfies the following two formulas:

|Rth(450)|/|Rth(550)|≦1, and

1≦|Rth(630)|/|Rth(550)|.

[15] The liquid-crystal display device of any one of [1]-[14], wherein the rear-side retardation region and/or the front-side retardation region is formed of a cellulose acylate film or comprises a cellulose acylate film.

[16] The liquid-crystal display device of any one of [1]-[15], wherein the rear-side retardation region and/or the front-side retardation region is formed of an acrylic polymer film or comprises an acrylic polymer film.

[17] The liquid-crystal display device of [16], wherein the rear-side retardation region and/or the front-side retardation region is formed of an acrylic polymer film comprising an acrylic polymer having at least one unit selected from lactone ring units, maleic anhydride units, glutaric anhydride units and glutarimide units, or comprises the acrylic polymer film.

[18] The liquid-crystal display device of any one of [1]-[17], wherein the rear-side retardation region and/or the front-side retardation region is formed of a cyclic olefin polymer film or comprises a cyclic olefin polymer film.

[19] The liquid-crystal display device of any one of [1]-[18], wherein the rear-side retardation region and/or the front-side retardation region is formed of a polypropylene polymer film or comprises a polypropylene polymer film.

[20] The liquid-crystal display device of any one of [1]-[19], wherein the rear-side retardation region and/or the front-side retardation region is formed of a biaxial polymer film or comprises a biaxial polymer film.

[21] The liquid-crystal display device of any one of [1]-[20], wherein the rear-side retardation region and/or the front-side retardation region comprises a uniaxial polymer film.

[22] The liquid-crystal display device of any one of [1]-[21], having a front contrast ratio of equal to or more than 1500.

[23] The liquid-crystal display device of any one of [1]-[22], which comprises a backlight unit sequentially emitting independent three primary colors and which is driven according to a field sequential driving system.

[24] The liquid-crystal display device of any one of [1]-[23], which is a VA-mode liquid-crystal display device.

According to the invention, it is possible to improve the front contrast ratio of a liquid-crystal display device having a retardation film for viewing angle compensation.

And according to the invention, it is possible to further improve the front contrast ratio of a liquid-crystal display device having an advanced high contrast ratio.

And according to the invention, it is possible to provide a liquid-crystal display device that realizes suitable viewing angle compensation and has an improved front contrast ratio.

And according to the invention, it is possible to provide a low-cost liquid-crystal display device that realizes a high contrast ratio.

BRIEF DESCRIPTION OF THE DRAWINGS

FIG. 1 is a schematic cross-sectional view of one example of the liquid-crystal display device of the invention.

In the drawing, the reference numerals and signs have the following meanings.

10 Liquid-Crystal Layer
12 Front-Side Substrate
14 Rear-Side Substrate
16 Front-Side Retardation Region
18 Rear-Side Retardation Region
20 Font-Side Polarizing Element
22 Rear-Side Polarizing Element
24 Backlight Unit
LC Liquid-Crystal Cell
PL1 Rear-Side Polarizer
PL2 Front-Side Polarizer

DETAILED DESCRIPTION OF THE INVENTION

The invention is described in detail hereinunder. Note that, in this patent specification, any numerical expressions in a style of "... to ..." will be used to indicate a range including the lower and upper limits represented by the numerals given before and after "to", respectively.

At first, the terms used in the description will be explained.
(Retardation, Re and Rth)

In this description, Re(λ) and Rth(λ) are retardation in plane (nm) and retardation along the thickness direction (nm), respectively, at a wavelength of λ. Re(λ) is measured by applying light having a wavelength of λ nm to a sample such as a film in the normal direction thereof, using KOBRA 21ADH or WR (by Oji Scientific Instruments).

When a sample to be analyzed is expressed by a uniaxial or biaxial index ellipsoid, Rth(λ) of the film is calculated as follows.

Rth(λ) is calculated by KOBRA 21ADH or WR based on six Re(λ) values which are measured for incoming light of a wavelength A nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the Rth(λ) of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulas (X) and (XI):

$$Re(\theta) = \left[nx - \frac{ny \times nz}{\sqrt{\left\{ny\ \sin\left(\sin^{-1}\left(\frac{\sin(-\theta)}{nx}\right)\right)\right\}^2 + \left\{nz\ \cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (X)$$

$$Rth = \left[\frac{nx+ny}{2} - nz\right] \times d \quad (XI)$$

wherein Re(θ) represents a retardation value in the direction tilted by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a uniaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of λ nm applied in the tilted direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In the description, any values of Re(λ) and Rth(λ) such as Re(450), R e(550), Re(630), Rth(450), Rth(550) and Rth (630) are calculated on the basis of the values obtained by measuring Re and Rth at three or more different wavelengths (for example, λ=479.2, 546.3, 632.8, 745.3 nm) respectively. More specifically, the obtained values are approximated by Cauchy's formula (to the third term, Re=A+B/λ$^2$+C/λ$^4$), and then the values of A, B and C are calculated respectively. The values of Re and Rth are re-plotted versus wavelength, λ, respectively, and then, Re(λ) and Rth(λ) at each wavelength, λ, can be obtained from the plot.

In this description, the "slow axis" of the retardation film and others means the direction in which the refractive index is the largest. The "visible light region" is from 380 nm to 780 nm. Unless otherwise specifically indicated the refractive index is one measured at λ=550 nm in the visible region.

In this description, it should be so interpreted that the numerical data, the numerical range and the qualitative expression (for example, expression of "equivalent", "equal" or the like) indicating the optical properties of the constitutive members such as the retardation region, the retardation film, the liquid-crystal layer and others shall be the numerical data, the numerical range and the qualitative properties including generally acceptable errors regarding the liquid-crystal display device and the constitutive members thereof.

In this description, a retardation film means a self-supporting film disposed between a liquid-crystal cell and a polarizing element (irrespective of the level of retardation). The retardation film is synonymous with a retardation layer. The retardation region is a generic term for one or more layers of a retardation film disposed between a liquid-crystal cell and a polarizing element. In this description, "front side" means the display panel side; and "rear side" means the backlight side. The subscripts "front", "rear" and "CF" added to "Re" or "Rth" indicate Re or Rth of a front-side retardation region, a rear-side retardation region and a color filter respectively. The term "Hz" means internal haze, and the subscripts "front" and "rear" added to "haze" indicate interior haze of a front-side retardation region and a rear-side retardation region respectively. And it is to be noted that internal haze is indicated by a term "haze" occasionally.

In this description, "front" means the normal line direction relative to the display panel; and "front contrast ratio (CR)" means the contrast ratio computed from the white brightness and the black brightness which are measured in the normal line direction to the display panel. And, in this description, "viewing angle contrast ratio (CR)" means the contrast ratio computed from the white brightness and the black brightness which are measured in the oblique direction relative to the normal line direction (for example, the direction defined by an azimuth angle of 45 degrees and a polar angle of 60 degrees relative to the display plane).

The liquid-crystal display device of the invention is described hereinunder with reference to the drawing.

FIG. 1 is a schematic cross-sectional view of one example of the liquid-crystal display device of the invention. The liquid-crystal display device of FIG. 1 comprises a front-side polarizing element 20, a rear-side polarizing element 22, a liquid-crystal cell LC disposed between the front-side polarizing element 20 and the rear-side polarizing element 22, a front-side retardation region 16 composed of one or more retardation layers disposed between the liquid-crystal cell LC and the front-side polarizing element 20, and a rear-side retardation region 18 composed of one or more retardation layers disposed between the liquid-crystal cell LC and the rear-side polarizing element 22.

The liquid-crystal cell LC comprises a liquid-crystal layer 10 and a pair of a front-side substrate 12 and a rear-side substrate 16 between which the liquid-crystal layer is sandwiched. The front-side retardation region 16 and the rear-side retardation region 18 have retardation that contributes toward viewing angle compensation, or that is, the total of retardation along the thickness-direction of the front-side retardation region 16 at a visible light wavelength λ nm, $Rth_{front}(\lambda)$ and retardation along the thickness-direction of the rear-side retardation region 18, $Rth_{rear}(\lambda)$ Preferably falls within a range capable of compensating $\Delta nd(\lambda)$ (where d means the thickness of the liquid-crystal layer (nm); $\Delta n(\lambda)$ means the refractivity anisotropy at a wavelength λ nm of the liquid-crystal layer; and $\Delta nd(\lambda)$ is the product of $\Delta n(\lambda)$ and d) in the black state of the liquid-crystal layer 10.

One characteristic feature of the liquid-crystal display device of the invention is that the magnitude relation in retardation along the thickness-direction, $Rth_{front}$ and $Rth_{rear}$, between the front-side retardation region 16 and the rear-side retardation region 18 existing on and below the liquid-crystal cell LC and the magnitude relation in the internal haze, $Hz_{front}$ and $Hz_{rear}$, therebetween satisfy the following formula (1) or (2):

$$Rth_{front}(\lambda) > Rth_{rear}(\lambda), \text{ and } Hz_{front} < Hz_{rear} \quad (1)$$

$$Rth_{front}(\lambda) < Rth_{rear}(\lambda), \text{ and } Hz_{front} > Hz_{rear}. \quad (2)$$

The wavelength λ at which the above-mentioned relational formula (1) or (2) is satisfied may be from 380 nm to 780 nm in a visible light region. In general, the above-mentioned relation is preferably satisfied at the center wavelength, 550 nm or so.

As a result of assiduous investigations, the present inventor has found that the contribution of the internal haze in the retardation region toward the front CR is significantly influenced by Rth of the respective retardation regions. The reason is because the internal haze of the retardation region (for example, the retardation film) is a scattering factor, and therefore scatters the oblique incident light from the backlight of a liquid-crystal display device in the front direction, and the optical phenomenon of scattering is dependent on light polarization. When the degree of ellipticity in the polarization state of light before the light is scattered by the internal haze of the respective retardation regions is larger, then the component not absorbed at the absorption axis of the front-side polarizing element, or that is, the front light leakage increases more.

The polarization state of the light from the backlight, after having passed through the rear-side retardation region but before being scattered by the internal haze of the rear-side retardation region, is mainly determined by $Rth_{rear}$ of the rear-side retardation region; and after that, the polarization state of the light, having passed through the liquid-crystal cell and the front-side retardation region but before being scattered by the internal haze of the front-side retardation region is mainly determined by $Rth_{rear}$ of the rear-side retardation region and $\Delta nd$ of the liquid-crystal layer. In consideration of the fact that the total of $Rth_{front}(\lambda)$ and $Rth_{rear}(\lambda)$ falls within a range capable of compensating retardation, $\Delta nd(\lambda)$, retardation of the liquid-crystal cell in the black state, is may be said that the polarization state of the light before being scattered by the internal haze of the front-side retardation region could be determined by $Rth_{front}$ of the front-side retardation region.

For example, in case where Rth of the front-side retardation region is equal to that of the rear-side retardation region, the degree of elliptical polarization of the light before being scattered by the internal haze of the front-side retardation region and that of the rear-side retardation region is equal to each other, and therefore the contribution of the light scattering by the internal haze of the front-side retardation region and that of the rear-side retardation region toward the front light leakage is equal to each other. On the other hand, in case where there is a difference between Rth of the front-side retardation region and that of the rear-side retardation region, for example, in case where $Rth_{front} > Rth_{rear}$, the degree of elliptical polarization of the light before being scattered by the internal haze of the front-side retardation region and that of the rear-side retardation region is in a relation of $ellipticity_{front} > ellipticity_{rear}$, and therefore the contribution of the rear-side scattering toward the front light leakage is smaller.

Specifically, in the invention, the phenomenon that the contribution of the light scattering by the internal haze of the front-side or rear-side retardation region toward the front CR varies depending on Rth of the respective retardation regions is utilized, and based on this, even popular, high-haze retardation films attain improving the front CR so far as they are disposed under the condition satisfying the above formula (1) or (2).

Regarding the influence of light scattering by the internal haze of a retardation film on the front CR, it may be said, as far as the inventor knows, that there is no precedent of investigating the influence in relation to Rth of the retardation film.

On the assumption that the polarized light running into a liquid-crystal cell could maintain its polarization state even after scattered by the inner parts, the effect of the invention could be described based on the trajectory of the polarized light on a Poincare sphere. On the other hand, heretofore, it is not considered that, when a polarized light is scattered, the light could keep the polarization state thereof; and therefore, the fact that the effect of the invention that has solved the problem of front CR reduction owing to light scattering inside a liquid-crystal cell could be described by the trajectory of a polarized light on a Poincare sphere could not be expected.

The liquid-crystal cell that the liquid-crystal display device of the invention has is not specifically defined. In general, regarding the front-side substrate and the rear-side substrate constituting a liquid-crystal cell, the parts disposed on the surface thereof (on the liquid-crystal layer-side surface) are not the same between the two; and an array part and a color filter part that are strong scattering factors are separately disposed only on the surface of any one substrate. There is known a color filter-on-array (COA) structure in which the two are disposed on one substrate, and in the liquid-crystal cell of the type, the scattering intensity significantly differs between the rear-side substrate and the front-side substrate. The invention exhibits the effect in any type of liquid-crystal cells. In one embodiment of the liquid-crystal display device of the invention, many parts to cause contrast ratio reduction exist on the rear side and the contrast ratio of the front-side substrate, CR(front) is higher than the contrast ratio of the rear-side substrate, CR(rear), and the liquid-crystal cell satisfies the following formula (a):

$$CR(rear) \leqq CR(front). \quad (a)$$

In another embodiment of the liquid-crystal display device of the invention, many parts to cause contrast ratio reduction exist on the front side and the contrast ratio of the rear-side substrate, CR(rear) is higher than the contrast ratio of the front-side substrate, CR(front), and the liquid-crystal cell satisfies the following formula (b):

$$CR(front) < CR(rear). \quad (b)$$

When the liquid-crystal cell (LC in FIG. 1) is disassembled into two substrates (substrates 12 and 14 in FIG. 1), the front-side substrate (substrate 12 in FIG. 1) and the parts formed on the substrate are generically referred to as the front-side substrate; and the rear-side substrate (substrate 14 in FIG. 1) and the parts formed on the substrate are generically referred to as the rear-side substrate. Examples of the parts include color filter, black matrix, array part (TFT array, etc.), projections on the substrate, common electrode, slits, etc. Specifically, the contrast ratio of the rear-side substrate of a liquid-crystal cell and that of the front-side substrate thereof (CR(rear) and CR(front)) each mean the total contrast ratio of the substrate and the parts formed on the substrate. The details of the measurement method are described in Examples given below.

One example of the liquid-crystal cell satisfying the formula (a) CR(rear)≦CR(front) is a COA-structured liquid-crystal cell. "COA" is an abbreviation of color filter-on-array, and a structure where a color filter is formed on an active matrix substrate is called a COA structure. At first, the COA structure is only for forming a color filter on an ordinary TFT substrate, but these days in general, in the structure, a pixel electrode is formed on the color filter, and via a small hole called a contact hole, the pixel electrode is connected to TFT for improving the display characteristics. The invention is applicable to any of these types. In the COA structure, the thickness of the color filter layer is larger than that of the ordinary-type color filter layer (1 to 2 μm or so), and is generally from 2 to 4 μm or so. This is for the purpose of preventing the parasitic capacity to form between the edge of the pixel electrode and the wiring. The thickness of the color filter layer that the liquid-crystal display device of the invention has is preferably from 2 to 4 μm, to which, however, the invention is not limited. In production of the COA-structured liquid-crystal cell, the pixel electrode on the color filter must be patterned, therefore requiring resistance to etchant and peelant. For this purpose, a color filter material (coloring photosensitive composition) of which the thickness is controlled to be thick is used, but a two-layered constitution of color filter layer formed of an ordinary color filter material+ overcoat layer may be employed Any constitution can be applied in the invention.

The COA structure is described in JP-A 2007-240544, 2004-163979 in addition to the above-mentioned Patent References 1 and 2, and in the invention, any constitution is employable.

Even a non-COA-structured liquid-crystal cell having a color filter layer on a rear-side substrate can satisfy the above-mentioned formula (a). In general, the degree of contribution of the array part toward contract reduction is higher than that of the color filter layer. In particular, various types of high-contrast color filters have been proposed, and there exist various types of non-COA-structured liquid-crystal cells satisfying the above formula (a). As an example of high-contrast color filters, there may be mentioned a color filter containing a pigment having a smaller particle size than that of the pigment in existing CF. As examples of the production method for the high-contrast color filter containing a pigment, the following two methods are mentioned.

(i) A method of mechanically more finely grinding pigment particles by the use of a disperser such as a sand mill, a roll mill, a ball mill or the like, which is described, for example, in JP-A 2009-144126, and this may be incorporated herein by reference.

(ii) A method of dissolving a pigment in a solvent followed by reprecipitating it to prepare fine pigment particles, which is described, for example, in JP-A 2009-134178.

Except pigment, a method of producing a high-contrast color filter with dye is proposed. It is described in detail in JP-A 2005-173532, which may be incorporated herein by reference.

One example of the liquid-crystal cell satisfying the above-mentioned formula (b), CR(front)<CR(rear) is an embodiment where a color filter-on-array (COA) substrate is used as the front-side substrate. As the COA substrate, those exemplified in the above may be used. In case where a COA substrate is used as the front-side substrate, various parts such as TFT array, color filter and others that cause reduction of the contrast ratio are disposed on the front-side substrate, and therefore, this embodiment could satisfy the above formula (b).

Examples of high-contrast liquid-crystal cells include a liquid-crystal cell not having a color filter, and a liquid-crystal cell not having a color filter but driven in a field-sequential driving mode. The field-sequential driving mode liquid-crystal cell is described in detail in JP-A 2009-42446, 2007-322988, and Japanese Patent 3996178, which are incorporated herein by reference. In the field-sequential driving mode, used are independent backlight units that sequentially emit lights of three primary colors. Preferred are backlight units each provided with LED as the light source; and for example, preferably used are backlight units each provided with an LED element emitting any of three colors of red, green and blue.

The effect of the invention is especially remarkable in a liquid-crystal display device having a high CR (for example, at least 1500) in which the light scattering by the internal haze in the retardation region can be recognized as the front CR reduction. Accordingly, in any embodiment where the liquid-crystal cell satisfies the above formula (a) or (b), the effect of the invention can be realized; but in particular, the invention is especially effective in an embodiment in which the liquid-crystal cell has a COA structure (the COA substrate may be disposed as the rear-side substrate or the front-side substrate), or the color filter layer is subjected to a high-contrast-ratio treatment, or the TFT array is subjected to a high-contrast-ratio treatment by thinning the line thereof.

Not only the front CR but also the front color tone in the black state (front blackness) is an important display characteristic of a liquid-crystal display device. The present inventor's investigations have revealed that, when retardation (Re and Rth) of the rear-side retardation region and/or the front-side retardation region has reversed wavelength dispersion characteristics of such that retardation is greater at a longer wavelength in the visible light region, then the color shift to a specific color of the front blackness can be reduced. When the reversed wavelength dispersion characteristics of retardation in the rear-side retardation region and/or the front-side retardation region are stronger, then the wavelength dependency of the elliptic polarization of the light running obliquely into the liquid-crystal display device from the light source (backlight) could be reduced with the result that the wavelength-dependent light leakage level could be thereby reduced and the color shift to a specific color of the front blackness could also be reduced.

More concretely, for example, in the embodiment satisfying the formula (1), in case where the rear-side retardation region is made to have a low retardation and have reversed wavelength dispersion characteristics, the front color shift in the black state can be reduced more, as compared with that in the other embodiment where the rear-side retardation region also has a low retardation but has regular wavelength dispersion characteristics. In the latter embodiment, somewhat bluish color shift is observed, but in the former embodiment, bluish color shift is seen little. On a u'v' chromaticity diagram, black must have v' of at least 0.375. On the u'v' chromaticity diagram, bluish color shift in the black state means reduction in the value v'. In the former embodiment, v' can reach 0.38 or more.

The effect of the invention is realized in any mode of liquid-crystal display devices. $\Delta$nd of the liquid-crystal layer in the black state varies depending on different modes. For example, the range of $\Delta$nd($\lambda$) in the black state of a VA-mode or TN-mode liquid-crystal layer, and the range of $Rth_0(\lambda)$ that is said to be necessary for optical compensation for the layer are shown in the following Table. The following data are only for exemplification, and the invention is not limited to these examples. In the following Table, the wavelength $\lambda$ is 550 nm.

|   | $\Delta$nd(550) of Liquid Crystal Layer in Black State | Range of $Rth_0(\lambda)$ necessary for Viewing-Angle Compensation |
|---|---|---|
| VA mode | 250 nm-370 nm | 150 nm-500 nm |
| TN mode | 300 nm-500 nm | 200 nm-600 nm |

In the invention, retardation of the rear-side retardation region and that of the front-side retardation region are not specifically defined so far as the above-mentioned formula (1) or (2) is satisfied. Depending on the mode of the liquid-crystal cell to be used and on $\Delta$nd of the liquid-crystal layer in the black state thereof, and depending on the magnitude relation in the internal haze, Rth of the rear-side retardation region and that of the front-side retardation region satisfying the above formula (1) or (2) may be determined. Similarly, the internal haze is not also specifically defined; however, in general, the parts of a liquid-crystal display device are required to have a low haze, and from this viewpoint, the internal haze is preferably at most 0.6, more preferably at most 0.3, even more preferably at most 0.2.

The measurement method for the internal haze of films is described below.

In the invention, there is not specific limitation on the difference between $Rth_{front}$ and $Rth_{rear}$, and on the difference between $Hz_{fron}$ and $Hz_{rear}$. Preferably, the difference between $Rth_{front}$ and $Rth_{rear}$ is from 10 to 2000 nm, more preferably from 50 to 1500 nm, even more preferably from 100 to 1300 nm. When the difference between $Hz_{fron}$ and $Hz_{rear}$ is equal to or more than 0.05, the effect of the invention could be confirmed. When the difference in Rth and/or the internal haze is less than the above range, then the effect would be insufficient; but on the other hand, in order that the two are made to have a difference over the above range, there may occur various limitations on the condition in film production (type of additive, the draw ratio in stretching, etc.), which are unfavorable from the viewpoint of production aptitude.

In the invention, preferably, Rth of the rear-side retardation region and that of the front-side retardation region are defined within the range satisfying the following formula:

$$0 \text{ nm} \leq |Rth(550)| \leq 300 \text{ nm}.$$

In addition, in the invention, Re of the rear-side retardation region and that of the front-side retardation region are preferably defined within the range satisfying the following formula:

$$0 \text{ nm} \leq Re(550) \leq 100 \text{ nm}.$$

One example of the invention is a VA-mode liquid-crystal display device. An embodiment of the VA-mode liquid-crystal display device satisfying the above formula (1) is described in detail hereinunder.

In this embodiment, on the premise that the internal haze and Rth satisfy the above formula (1) and further, when Rth of the rear-side retardation region satisfies the following formula (I), then a remarkable effect of retarding reduction of the front CR can be achieved.

$$|Rth(550)| \leq 90 \text{ nm}. \tag{I}$$

The rear-side retardation may have a single layer structure or may be a laminate of two or more layers. In the embodiment where the region has a single layer structure, the layer preferably satisfies the formula (I); and in the embodiment where the region is a laminate of at least two layers, the laminate preferably satisfies the above formula (I) as a whole.

The front side retardation region may also be a single layer structure or a laminate composed of two or more layers. Preferably, $Rth_{front}$ of the front-side retardation region is on a level capable of compensating $\Delta$nd of the liquid-crystal layer in the black state, along with $Rth_{rear}$ of the rear-side retardation region. As shown in the above Table, $\Delta$nd(550) of the VA-mode liquid-crystal layer is from 250 nm to 370 nm, and generally from 280 to 350 nm or so. Combinations of the front-side retardation region and the rear-side retardation region suitable for compensation of $\Delta$nd($\lambda$) are described in various patent publications, for example, Japanese Patents 3282986, 3666666 and 3556159, which may be incorporated herein by reference. From this viewpoint, the front-side retardation region preferably satisfies the following formulas (III) and (IV):

$$30 \text{ nm} \leq Re(550) \leq 90 \text{ nm}, \tag{III}$$

$$150 \text{ nm} \leq Rth(550) \leq 300 \text{ nm}. \tag{IV}$$

For satisfying the above-mentioned characteristics, the front-side retardation region may be formed of one or more biaxial polymer films, or may comprise one or more biaxial polymer films. Further, the front-side retardation region may comprise one or more uniaxial polymer films.

$\Delta$nd of a VA-mode liquid-crystal cell is generally from 280 to 350 nm or so, and this is for increasing as much as possible the transmittance in the white state. On the other hand, when $\Delta$nd is less than 280 nm, the white brightness may decrease slightly along with the reduction in $\Delta$nd, but since the cell thickness d is small, the liquid-crystal display device can be excellent in rapid responsibility. In case where the rear-side retardation region has a low retardation, then the light leakage in the front direction is reduced and, as a result, the characteristic feature of the invention of attaining a high front CR is effective in any liquid-crystal display devices having different Δnd(550).

In one embodiment of the invention, the rear-side retardation region (18 in FIG. 1) satisfies the following formula (II):

$$|Re(550)| \leq 20 \text{ nm}. \tag{II}$$

Even when a retardation film having a high Re is disposed on the rear side, the effect of the invention is attained so far as Rth satisfies the above-mentioned formula (I). On the other hand, in case where a retardation film having Re in some degree is disposed on the rear side, strict axial alignment would be necessary in relation to the optical axis of other parts such as the absorption axis of the rear-side polarizing element, etc. Preferably, the rear-side retardation region has a low Re and satisfies the above-mentioned formula (II) as a whole, as facilitating axial alignment in incorporating one or more retardation films to be the rear-side retardation region in the liquid-crystal display device.

Another advantage of the invention is reduction in "circular unevenness". "Circular unevenness" is a phenomenon of circular light leakage to occur in a liquid-crystal panel in the black state after exposed to a high-temperature/high-humidity atmosphere. Its detail is described in JP-A 2007-187841. One reason is because the backlight-side liquid-crystal cell substrate (that is, rear-side substrate 14 in FIG. 1) is warped when exposed to a high-temperature/high-humidity atmosphere. In this embodiment, since retardation of the rear-side retardation region is small, warping of the substrate, if any, would have little influence on retardation. Further in the liquid-crystal cell of the COA structure, a color filter is also disposed in addition to the array part on the rear-side substrate, and the substrate is therefore hardly warped even under heat, and as a result, circular unevenness can be reduced.

One example of this embodiment is a VA-mode liquid-crystal display device where the rear-side retardation region (18 in FIG. 1) satisfies the formula (Ia):

$$|Rth(550)| \leq 20 \text{ nm}. \tag{Ia}$$

When the formula (Ia) is satisfied, the circular unevenness may be reduced more.

From the viewpoint of the circular unevenness, the thickness of the retardation film disposed in the rear-side retardation region (18 in FIG. 1) is preferably smaller; and concretely, the thickness is preferably from 2 to 100 μm or so, more preferably from 2 to 60 μm or so, even more preferably from 2 to 40 μm or so.

In case where the part inside the liquid-crystal cell such as the color filter layer also has retardation along the thickness-direction, preferably, retardation along the thickness-direction of the color filter layer, $Rth_{CF}$ is taken into consideration in determining $Rth_{rear}$ of the rear-side retardation region. More preferably, the above formula (I) satisfies the following formula (I') with $Rth_{CF}$ taken into consideration, $$|Rth_{CF} + Rth_{rear}| \leq 90 \text{ nm}, \tag{I'}$$

and the above formula (Ia) satisfies the following formula (I'a), $$|Rth_{CF} + Rth_{rear}| \leq 20 \text{ nm}. \tag{I'a}$$

It is presumed that $Rth_{CF}$ of the color filter layer would be expressed by binder alignment or pigment molecule packing.

It is presumed that $Rth_{CF}$ of the color filter layer would be expressed in the process of forming the color filter layer, in which the molecules of its materials, binder and pigment, would be aligned or packed. Even though expressed, $Rth_{CF}$ of the color filter layer is extremely small, and would be generally from −45 to 45 nm or so. In case where a retardation enhancer (retardation regulator) is positively added, the filter could express Rth in a range of from −70 to 80 nm or so. Examples of usable retardation enhancers are the same as those of the Rth enhancers usable for the retardation film to be mentioned hereinunder. In case where Rth of the color filter layer is increased, for example, a compound of the following general formula (X) and a compound similar thereto may be used as the retardation enhancer. In case where Rth of the color filter layer is reduced, for example, a compound of the following general formula (XI) and a compound similar thereto may be used as the retardation reducer. Forming the color filter layer with the above-mentioned retardation enhancer added thereto makes it possible to control $Rth_{CF}$ of the color filter layer.

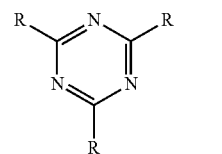

General formula (X)

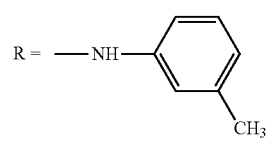

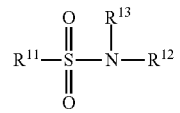

General formula (XI)

In the above-mentioned general formula (XI), $R^{11}$ represents an alkyl group or an aryl group; $R^{12}$ and $R^{13}$ each independently represent a hydrogen atom, an alkyl group or an aryl group. Especially preferably, the sum total of the carbon atoms of $R^{11}$, $R^{12}$ and $R^{13}$ is equal to or more than 10.

As described in the above, $Rth_{CF}$ of the color filter layer preferably satisfies the following two formulas:

$$|Rth_{CF}(450)|/|Rth_{CF}(550)| \leq 1, \text{ and}$$

$$1 \leq |Rth_{CF}(630)|/|Rth_{CF}(550)|.$$

Specifically, in a visible light region, preferably, $Rth_{CF}$ has reversed wavelength dispersion characteristics, or is constant irrespective of wavelength. More preferably, $Rth_{CF}$ has reversed wavelength dispersion characteristics.

$Rth_{CF}$ of the color filter layer is controllable for every pixel. In case where the liquid-crystal display device has plural color filter layers, $Rth_{CF}$ of the color filter layer having a highest transmittance at a wavelength of 450 nm is $Rth_{CF}$(450); $Rth_{CF}$ of the color filter layer having a highest transmittance at a wavelength of 550 nm is $Rth_{CF}$(550); and $Rth_{CF}$ of the color filter layer having a highest transmittance at a wavelength of 630 nm is $Rth_{CF}$(630).

As described above, by adjusting Δnd(550) of the VA-mode liquid crystal cell to the range of from about 280 nm to about 350 nm, it is possible also to improve the transmittance in the white state. In the embodiment wherein the rear-side retardation region satisfies formula (Ia), for improving also the viewing angle CR, the front-side retardation region preferably satisfies following formulas (IIIa) and (IVa):

$$30 \text{ nm} \leq Re(550) \leq 90 \text{ nm} \tag{IIIa}$$

$$180 \text{ nm} \leq Rth(550) \leq 300 \text{ nm}; \tag{IVa}$$

and in the embodiment having the VA-mode liquid crystal cell whose $\Delta nd(550)$ is from about 280 nm to about 350 nm, the front-side retardation region preferably satisfies following formulas (IIIa-1) and (IVa-1):

$$50 \text{ nm} \leq Re(550) \leq 75 \text{ nm} \tag{IIIa-1}$$

$$200 \text{ nm} \leq Rth(550) \leq 300 \text{ nm}; \tag{IVa-1}$$

and more preferably satisfies following formulas (IIIa-2) and (Iva-2):

$$50 \text{ nm} \leq Re(550) \leq 75 \text{ nm} \tag{IIIa-2}$$

$$220 \text{ nm} \leq Rth(550) \leq 270 \text{ nm}. \tag{Iva-2}$$

In terms of retardation-film producibility, practically, the embodiments employing the retardation film satisfying Rth (550)$\leq$230 nm are preferable. This is because, usually, for preparing any retardation film having high retardation, stretching with a high stretching ratio may be carried out; and is because stretching with a higher stretching ratio may cause breaking more frequently.

From this viewpoint, in the embodiment wherein the rear-side retardation region satisfies formula (Ia), for also improving the viewing angle CR, the front-side retardation region preferably satisfies following formulas (IIIA) and (IVa):

$$30 \text{ nm} \leq Re(550) \leq 90 \text{ nm} \tag{IIIa}$$

$$180 \text{ nm} \leq Rth(550) \leq 300 \text{ nm}; \tag{IVa}$$

and in the embodiment wherein $\Delta nd(550)$ of the VA-mode liquid crystal cell is equal to or smaller than 280 nm, the front-side retardation region more preferably satisfies following formulas (IIIa-3) and (Iva-3):

$$50 \text{ nm} \leq Re(550) \leq 80 \text{ nm} \tag{IIIa-3}$$

$$180 \text{ nm} \leq Rth(550) \leq 280 \text{ nm}; \tag{Iva-3}$$

and even more preferably satisfies following formulas (IIIa-4) and (Iva-4):

$$50 \text{ nm} \leq Re(550) \leq 80 \text{ nm} \tag{IIIa-4}$$

$$180 \text{ nm} \leq Rth(550) \leq 230 \text{ nm}. \tag{Iva-4}$$

Another example of the embodiment is a VA-mode liquid crystal display device having the rear-side retardation region (indicated with 18 in FIG. 1) satisfying following formula (Ib):

$$20 \text{ nm} < |Rth(550)| \leq 90 \text{ nm}. \tag{Ib}$$

In the embodiment wherein the rear-side retardation region satisfies formula (Ib), for also improving the viewing angle CR, it is not necessary to use any retardation film having so large retardation as the front-side retardation region because the rear-side retardation region may share retardation required for improving the viewing angle. Namely, according to the embodiment wherein the rear-side retardation region satisfies formula (Ib), it is possible to obtain not only the effect of the invention but also improvement of the viewing angle with good producibility.

In the embodiment wherein the rear-side retardation region satisfies formula (Ib), for also improving the viewing angle, the front-side retardation region preferably satisfies formulas (IIIb) and (IVb):

$$30 \text{ nm} \leq Re(550) \leq 90 \text{ nm} \tag{IIIb}$$

$$150 \text{ nm} \leq Rth(550) \leq 270 \text{ nm}; \tag{IVb}$$

and in the embodiment wherein $\Delta nd(550)$ of the VA-mode liquid crystal cell is from about 280 nm to about 350 nm, the front-side retardation region more preferably satisfies following formulas (IIIb-1) and (IVb-1):

$$50 \text{ nm} \leq Re(550) \leq 80 \text{ nm} \tag{IIIb-1}$$

$$170 \text{ nm} \leq Rth(550) \leq 270 \text{ nm}; \tag{IVb-1}$$

and even more preferably satisfies following formulas (IIIb-2) and (IVb-2):

$$50 \text{ nm} \leq Re(550) \leq 80 \text{ nm} \tag{IIIb-2}$$

$$170 \text{ nm} \leq Rth(550) \leq 230 \text{ nm}. \tag{IVb-2}$$

And in the embodiment wherein $\Delta nd(550)$ of the VA-mode liquid crystal cell is equal to or smaller than 280 nm, the front-side retardation region more preferably satisfies following formulas (IIIb-3) and (IVb-3):

$$60 \text{ nm} \leq Re(550) \leq 90 \text{ nm} \tag{IIIb-3}$$

$$150 \text{ nm} \leq Rth(550) \leq 250 \text{ nm}; \tag{IVb-3}$$

and more preferably satisfies following formulas (IIIb-4) and (IVb-4):

$$60 \text{ nm} \leq Re(550) \leq 90 \text{ nm} \tag{IIIb-4}$$

$$150 \text{ nm} \leq Rth(550) \leq 230 \text{ nm}. \tag{IVb-4}$$

In FIG. 1, all or a part of the rear-side retardation region 18 and the front-side retardation region 16 may function as a protective film for the rear-side polarizing element 22 and the front-side polarizing element 20, respectively. Though not shown in FIG. 1, the rear-side polarizing element 22 may additionally have any functional film such as protective film, antifouling film, antireflection film, antiglare film, antistatic film or the like on the surface thereof facing the backlight 24; and similarly, the front-side polarizing element may additionally have any functional film such as protective film, antifouling film, antireflection film, antiglare film, antistatic film or the like on the panel-side surface thereof.

As described in the above, in a system where one side shares a large retardation for optical compensation, heretofore, the film having a large retardation is generally disposed on the rear side; however, it is considered that, in case where the high-retardation film is disposed on the front side, as in the present invention, the yield of polarizing plate may increase. The reason is described below.

The high-retardation film requires a step of stretching it at a high draw ratio, and therefore, its width could hardly be broadened, as compared with inexpensive films not requiring many additives in their production, or that is, so-called plane TAC (triacetyl cellulose film having Re of from 0 to 10 nm and Rth of from 30 to 80 nm), or low-retardation films. In ordinary liquid-crystal display devices, a wide liquid-crystal cell is used, and in general, the absorption axis of the front-side polarizing element is disposed in the horizontal direction (in the width direction) while the absorption axis of the rear-side polarizing element is disposed in the vertical direction (in the length direction). Further, in industrial-scale mass-production, the polarizing element and the retardation film are stuck together generally in a roll-to-roll system. Taking the matter into consideration that the polarizer produced according to the method is stuck to the liquid-crystal cell, it is recommended to arrange the high-retardation film on the front side for efficiently using the width direction of the polarizing plate, or that is, the production yield is increased. In case where a low-retardation film is disposed on the rear side as in the present invention, the film can be readily prepared as a wide film, and it can be combined with a wide polarizing element to further increase the production yield. As a result, an amount of the polarizing plate to be wasted may be reduced.

This is described with reference to concrete numerical data. In general, the width of a retardation film is 1100 mm, 1300 mm, 1500 mm, 2000 mm or 2500 mm; and the thickness of the film is about 25 µm, 40 µm or 80 µm. The length of the roll of the film is about 2500 m or 4000 m. On the other hand, regarding the panel size of a VA-mode liquid-crystal display device for application to TV, the panel size may be 20 inches, 32 inches, 40 inches, 42 inches, 52 inches or 68 inches. As one example, 42-inch panels most popularly released at present are discussed here. The 42-inch panel (standard 4:3) has a panel width of 853 mm (42-inch wide panel 16:9 has 930 mm), and a panel height of 640 mm (42-inch wide panel has 523 mm). In a conventional ordinary system where a high-retardation film is disposed on the rear side, only one retardation film for panel could be taken from a retardation film having, for example, a width of 1300 mm or 1500 mm in the width direction thereof. However, in the embodiment of the present invention, a high-retardation film is disposed on the front side, and therefore, even a retardation film having a width of, for example, 1300 mm or 1500 mm could be so cut that the height of the thus-cut film piece corresponding to the height of the panel size could be in the width direction of the film, or that is, retardation films for two panels can be taken in the width direction, and the producibility may be doubled. The TV size is increasing year by year, and for example, a 65-inch (standard) TV has a panel width of 991 mm and a panel height of 1321 mm. In conventional ordinary rear-side arrangement in such a wide-view TV, even a wide-sized 2000-mm film could give only one retardation film for one panel in the width direction. Contrary to this, in the front-side arrangement as in the embodiment of the present invention, the film can give retardation films for two panels in the width direction. Further, a 68-inch (wide-view) TV has a panel width of 1505 mm and a panel height of 846 mm, for which about doubled productivity can be expected similarly.

And types of the backlight which can be used in the liquid crystal display device of the invention are not limited. The front contrast ratio may be further improved by adjusting the angle profile of the outgoing light from the backlight. Concretely, use of a backlight having a higher light-collecting ability increases the absolute value of the front contrast, whereby the increase in the front CR absolute value indicating the effect of the invention is also increased. The light-collection index is represented by, for example, the ratio of the outgoing light intensity at the front, I(0°) to the outgoing light intensity at a polar angle of 45 degrees, I(45°), I(0°)/I(45°); and the larger value indicates a backlight having a higher light-collecting ability. As the backlight having a high light-collecting ability, preferred is arrangement of a prism film having a light-collecting function (prism layer) between a diffusive film and a liquid-crystal panel. The prism film acts to collect the light that has been emitted through the light-emitting face of a light guide plate and has been diffused by a diffusive film, in the effective display area of a liquid-crystal panel with high efficiency. A liquid-crystal display device with an ordinary direct-lighting backlight built therein comprises, for example, a liquid-crystal panel comprising a transparent substrate, a color filter sandwiched between polarizing plates, and a liquid-crystal layer on the upper part thereof, and comprises a backlight arranged on the lower side. US 3M's trade name, Brightness Enhancement Film (BEF) is a typical example. BEF is a film comprising unit prisms each having a triangular cross section, as periodically arranged in one direction, in which the prism has a larger size (pitch) than the wavelength of light. BEF collects the "off-axis" light and redirects or recycles it "on-axis" toward viewers. There are known many patent publications such as JP-B 1-37801, JP-A 6-102506 and JP-T 10-506500 that disclose employment of such a brightness controlling part having a recurring array structure of prisms, such as typically BEF, in displays.

For enhancing the light-collecting ability, also preferred is use of a lens array sheet. The lens array sheet has a lens surface that comprises plural unit lenses formed to have a convex profile and arranged two-dimensionally at a predetermined pitch. A preferred embodiment of the lens array sheet is so designed that the side thereof opposite to the lens surface is a flat surface and a light-reflective layer to reflect light in the non-light-collecting region of the lens is formed on the flat surface. Also preferred is a lens array sheet that has a lenticular lens surface with plural convex-shaped cylindrical lenses arranged in parallel to each other at a predetermined pitch, wherein the side opposite to the lens surface is a flat surface and the flat surface has, as formed thereon, a light-reflective layer to reflect lengthwise-direction stripe light in the non-light-collection region of the convex-shaped cylindrical lenses. In addition, also usable are, for example, a lenticular lens array sheet where unit lenses each composed of a cylindrical curved surface are arranged in one direction in the surface thereof, and a lens array sheet where unit lenses each having a circular, rectangular, hexagonal or the like bottom shape and composed of a dome-like curved surface are two-dimensionally arranged in the surface thereof. These lens array sheets are described in JP-A 10-241434, 2001-201611, 2007-256575, 2006-106197, 2006-208930, 2007-213035, 2007-41172, etc., and these are incorporated herein by reference.

The invention is also effective in an embodiment of a display where the color reproduction region is enlarged by controlling the going-out light spectrum from the backlight and the transmission spectrum through the color filter. Concretely, as the backlight, preferably employed is a white backlight for which a red LED, a green LED and a blue LED are combined for color mixing. Also preferably, the half-value width of the peak of the light emitted by the red LED, the green LED and the blue LED is small. Of LED, the half-value wavelength width is 20 nm or so and is small as compared with that of CCFL; and when the peak wavelength of R (red) is 610 nm or more, that of G (green) is 530 nm and that of B (blue) is 480 nm or less, then the color purity of the light source itself can be increased.

It is reported that, except the peak wavelength of LED, when the spectral transmittance of a color filter is minimized as much as possible, then the color reproducibility can be further improved and the NTSC ratio can have a characteristic of 100%. For example, this is described in JP-A 2004-78102. In a red color filter, the transmittance at the peak position of green LED and blue LED is preferably small; in a green color filter, the transmittance at the peak position of blue LED and red LED is preferably small; and in a blue color filter, the transmittance at the peak position of red LED and green LED is preferably small. Concretely, the data of the transmittance are all at most 0.1, more preferably at most 0.03, even more preferably at most 0.01. Regarding the relationship between backlight and color filter, for example, a description is given in JP-A 2009-192661, which may be incorporated herein by reference.

Also preferred is use of a laser light source as the backlight for enlarging the color reproduction region. Preferably, the peak wavelength of the red, green and blue laser light sources is from 430 to 480 nm, from 520 to 550 nm, and from 620 to 660 nm, respectively. Regarding the laser light source serving as a backlight, a description is given in JP-A 2009-14892, which may be incorporated herein by reference.

The VA-mode liquid-crystal display device of one embodiment of the invention can be driven in any mode, concretely in any mode of MVA (Multi-Domain Vertical Alignment), PVA (Patterned Vertical Alignment), OP (Optical Alignment) or PSA (Polymer-Sustained Alignment). The details of these modes are described in JP-A 2006-215326, and JP-T 2008-538819. The optical alignment mode and the PSA mode realize high front contrast ratio. The advantage of the invention is more remarkable in a high-contrast panel.

Various members which can be used in the VA-mode liquid crystal display device, which is an embodiment of the invention, are described in detail below.

1. Rear-Side and Front-Side Retardation Regions

According to the invention, one or two or more retardation layers as a whole, which are disposed between the rear-side polarizing element and the liquid crystal cell, are called "rear-side retardation region". Preferably, Rth of the rear-side retardation region satisfies the following formula:

$$0\ nm \leq |Rth(550)| \leq 300\ nm$$

and/or Re of the rear-side retardation region satisfies the following formula:

$$0\ nm \leq Re(550) \leq 100\ nm.$$

In the embodiment satisfying the above formula (1), preferably, the rear-side retardation region more satisfies the above formula (I) as a whole; and more preferably, it satisfies the above formula (II) as a whole.

In an embodiment, preferably, the rear-side retardation region satisfies the above formula (Ia); and more preferably, it satisfies the following formulas:

$$0\ nm \leq Re(550) \leq 20\ nm\ and\ |Rth(550)| \leq 20\ nm;$$

even more preferably, it satisfies the following formulas:

$$0\ nm \leq Re(550) \leq 10\ nm\ and\ |Rth(550)| \leq 10\ nm;$$

and even much more preferably, it satisfies the following formulas:

$$0\ nm \leq Re(550) \leq 5\ nm\ and\ |Rth(550)| \leq 5\ nm.$$

In another embodiment, the rear-side retardation region satisfies the above formula (Ib), more preferably, it satisfies the following formulas:

$$0\ nm \leq Re(550) \leq 20\ nm\ and\ 20\ nm < |Rth(550)| \leq 90\ nm;$$

even more preferably, it satisfies the following formulas:

$$0\ nm \leq Re(550) \leq 10\ nm\ and\ 30\ nm \leq |Rth(550)| \leq 90\ nm;$$

and even much more preferably, it satisfies the following formulas:

$$0\ nm \leq Re(550) \leq 10\ nm\ and\ 40\ nm \leq |Rth(550)| \leq 80\ nm.$$

According to the invention, one or two or more retardation layers as a whole, which are disposed between the front-side polarizing element and the liquid crystal cell, are called "front-side retardation region". Preferably, Rth of the front-side retardation region satisfies the following formula:

$$0\ nm \leq |Rth(550)| \leq 300\ nm$$

and/or Re of the front-side retardation region satisfies the following formula:

$$0\ nm \leq Re(550) \leq 100\ nm.$$

In the embodiment satisfying the above formula (1), the front-side retardation region satisfies the above formulas (III) and (IV); and in the embodiment wherein the rear-side retardation region satisfies the above formula (Ia), preferably, the front-side retardation region satisfies the above formulas (IIIa) and (IVa). Especially, in the embodiment wherein Δnd (550) of the VA-mode liquid crystal cell is from about 280 nm to about 350 nm, more preferably, the front-side retardation region satisfies the above formulas (IIIa-1) and (IVa-1); even more preferably, and it satisfies the above formulas (IIIa-2) and (IVa-2). On the other hand, in the embodiment wherein Δnd(550) of the VA-mode liquid crystal cell is equal to or smaller than 280 nm, more preferably, the front-side retardation region satisfies the above formulas (IIIa-3) and (IVa-3); even more preferably, and it satisfies the above formulas (IIIa-4) and (IVa-4). In the embodiment wherein the rear-side retardation region satisfies the above formula (Ib), preferably, the front-side retardation region satisfies the above formulas (IIIb) and (IVb). Especially, in the embodiment wherein Δnd (550) of the VA-mode liquid crystal cell is from about 280 nm to about 350 nm, more preferably, the front-side retardation region satisfies the above formulas (IIIb-1) and (IVb-1); even more preferably, and it satisfies the above formulas (IIIb-2) and (IVb-2). On the other hand, in the embodiment wherein Δnd(550) of the VA-mode liquid crystal cell is equal to or smaller than 280 nm, more preferably, the front-side retardation region satisfies the above formulas (IIIb-3) and (IVb-3); even more preferably, and it satisfies the above formulas (IIIb-4) and (IVb-4). However, as described above, the invention is not limited to the embodiment employing a VA-mode.

The materials of one or more layers constituting the rear-side or front-side retardation region are not limited. The retardation region satisfying the above formulas (I) and (II) or the above formulas (III) and (IV) can be constituted by one or more biaxial films or by plural uniaxial films such as any combination of C-plate and A-plate; and of course, the retardation region can be also constituted by any combination of one or more biaxial films and one or more uniaxial films. In terms of saving the cost, preferably, at least one of the rear-side and front-side retardation regions is constituted by a single film, and more preferably, both are constituted by a single film respectively.

In any of the above-described embodiments, the wavelength dispersion characteristics of retardation in-plane (Re) of the rear-side and front-side retardation regions preferably becomes larger at a longer wavelength, that is, Re of the rear-side and front-side retardation regions preferably shows the reversed wavelength dispersion characteristics. Namely, Re of the rear-side and front-side retardation regions preferably satisfies Re(450)<Re(550)<Re(630). This is because, using the retardation region in which Re exhibits the reversed wavelength dispersion characteristics, the optical properties may be optimized in all of visible-light wavelength region if the optical properties are optimized at the center wavelength of the visible light, about 550 nm. Most preferably, Re of the retardation region exhibits the reversed-dispersion characteristics, and preferably Re of the retardation region is constant with wavelength variation. As well as Re, Rth of the rear-side retardation region preferably exhibits a higher value at a longer wavelength, that is, the reversed-dispersion characteristics, or is preferably constant with wavelength variation in the visible light wavelength. The reversed-dispersion characteristics are more preferable. That Rth exhibits the reversed-dispersion characteristics or is constant is defined identically as Rth satisfying the following two formulas:

$|Rth(450)|/|Rth(550)| \leq 1$ and $1 \leq |Rth(630)|/|Rth(550)|$.

The embodiment, wherein Re of the rear-side retardation region exhibits the characteristics other than normal-dispersion characteristics, that is, Re exhibits the reversed-dispersion characteristics or is constant with wavelength variation, is preferable in terms of reducing the front bluish tone in the black state, compared with the embodiment, wherein Re of the rear-side retardation region exhibits the normal-dispersion characteristics.

The effect caused by Re of the rear-side retardation region exhibiting the reversed-dispersion characteristics is improvement in the front black state (reduction in the front bluish tone in the black state); and, on the other hand, the effect caused by Re of the front-side retardation region exhibiting the reversed-dispersion characteristics is improvement in the viewing angle characteristics such as improvement in viewing angle CR and improvement in the viewing angle color (reduction in the color variation in the oblique direction in the black state). Namely, the embodiment, wherein the rear-side retardation region exhibits low retardation and the reversed-dispersion characteristics and the front-side retardation region satisfies the above formulas (III) and (IV) and exhibits the reversed-dispersion characteristics, may be improved in terms of both of front CR and viewing angle CR, that is, may exhibit the good characteristics in terms of the front and viewing angle black state.

As described above, for obtaining the higher front CR, internal haze of the retardation film(s) constituting the rear-side or front-side retardation region is preferably equal to or smaller than 0.6, more preferably equal to or smaller than 0.3, and even more preferably equal to or smaller than 0.2.

In the description, the term "haze" means internal haze. Usually, "haze" of a film can be an indicator indicating transparency thereof, and may be measured using a haze-meter according to JIS K-6714. The smaller haze a film has, the higher transparency the film has.

Usually, haze of a film may be determined by scattering due to the surface condition and internal scattering factors (such as crystallized state), however, in a liquid crystal display device, the surface condition of a film may not contribute to lowering the front CR of the liquid crystal display device because the surface condition may be lost by being coated with an adhesive or the like. Therefore, according to the invention, internal haze, which contributes to lowering the front CR, is used as an indicator for evaluation of scattering in the internal film.

In the description, the method for measuring haze of a film is as follows. A film sample, 40 mm×80 mm, is prepared, and haze of the sample is measured using a haze-meter (NDH-2000, NIPPON DENSHOKU INDUSTRIES CO., LTD.) under a condition of 25 degrees Celsius and 60% RH according to JIS K-6714. Internal haze is a value obtained by subtracting the haze value of the blank from the haze value of the sample. The haze values of the sample and the blank are measured as follows. In a container made of quartz or the like, a target film is placed and liquid showing the refractive index nearly same as that of the film is poured into the container, and then, the haze value is measured, which is the haze value of the sample. Then, the film is removed from the container, and the haze value is measured, which is the haze value of the blank. Examples of liquid which can be used in measurements of cellulose acylate- base films include liquid paraffin; and examples of liquid which can be used in measurements of polypropylene-base resin films include dimethyl phthalate.

The rear-side or front-side retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-base polymer, a polyester-base polymer such as polyethylene terephthalate or polyethylene naphthalate, an acrylic-base polymer such as polymethylmethacrylate, or a styrene-base polymer such as polystyrene or an acrylonitrile-styrene copolymer (AS resin) may be used. Polyolefin such as polyethylene or polypropylene, a polyolefin-base polymer such as an ethylene-propylene copolymer, a vinyl chloride-base polymer, an amide-base polymer such as nylon or aromatic polyamide, an imido-base polymer, a sulfone-base polymer, a polyether sulfone-base polymer, polyetherether ketone-base polymer, a polyphenylensulfide-base polymer, a vinylidene chloride-base polymer, a vinyl alcohol-base polymer, a vinyl butyral-base polymer, an acrylate-base polymer, a polyoxymethylene-base polymer, an epoxy-base polymer, and a polymer containing a mixture of the above polymers, and are used as a major ingredient for preparing the retardation film constituting the rear-side or front-side retardation region satisfying the above-described properties.

As a retardation film satisfying the formulas (I) and (II) alone or a lamination of two or more films satisfying the formulas (I) and (II) as a whole, or a retardation film satisfying the formulas (II) and (IV), cellulose acylate-base, acryl-base polymer, cycloolefin-base polymer and polypropylene-base resin films are preferable.

Cellulose Acylate-Base Film:

In the description, the term "cellulose acylate-base film" means a film containing any cellulose acylate(s) as a major ingredient (50 mass % or more with respect to the total mass of all ingredients). The cellulose acylate(s) which can be used for preparing the film is a compound in which hydrogen atom(s) of hydroxy group in the cellulose acylate is substituted with an acyl group. The cellulose acylate is a compound in which hydrogen atom(s) of hydroxy group in the cellulose acylate is substituted with an acyl group; and the acyl group having from 2 (acetyl) to 22 carbon atoms may be used as the substituent. Regarding the cellulose acylate which can be used in the invention, the substitution degree of hydroxy group in cellulose is especially not limited. The degree of substitution (degree of acylation) can be obtained by measuring the binding degree of acetic acid and/or $C_3$-$C_{22}$ aliphatic acid to hydroxy(s) in cellulose and then calculating the measured values(s). The measuring may be carried out according to ASTM Ⓓ D-817-91.

The substitution degree of the cellulose acylate which can be used as a material of the retardation film(s) constituting the retardation region is especially not limited, and is preferably from 2.30 to 3.00. The reversed-dispersion characteristics of the cellulose acylate-base film may be prepared by controlling the substitution degree or using any retardation enhancer, which is described in JP-A 2009-63983 or the like.

The cellulose acylate is preferably cellulose acetate, and may have any acyl group other than acetyl in place of acetyl or together with acetyl. Among these, cellulose acylates having at least one acyl selected from the group consisting of acetyl, propionyl and butyryl is preferable; and cellulose acylates having at least two selected from the group consisting of acetyl, propionyl and butyryl is more preferable. And cellulose acylates having acetyl and propionyl and/or butyryl are even more preferable; and the cellulose acylates having the substitution degree of acetyl of from 1.0 to 2.97 and the substitution degree of propionyl and/or butyryl of from 0.2 to 2.5 are even much more preferable.

The mass-averaged polymerization degree of the cellulose acylate to be used for preparing the retardation film constituting the retardation region is preferably from 200 to 800, and more preferably from 250 to 550. The number-averaged molecular weight of the cellulose acylate to be used for preparing the retardation film constituting the retardation region is preferably from 70000 to 230000, more preferably from 75000 to 230000, and even more preferably from 78000 to 120000.

Examples of the cellulose acylate(s) which can be used for preparing the film satisfying the formula (Ia) include those described in JP-A 2006-184640, [0019]-[0025].

The cellulose acylate-base film to be used as a part of the retardation region or as the retardation region itself is preferably prepared according to a solution casting method. In this method, a solution (dope) which is prepared by dissolving cellulose acylate in an organic solvent is used for forming the film. When at least one additive is used, the additive may be added to a dope in any step during preparing the dope.

In preparing the cellulose acylate-base film for the front-side retardation region, any retardation enhancer is preferably used, and in preparing the cellulose acylate-base film for the rear-side retardation region, any retardation enhancer may be used. Examples of the retardation enhancer which can be used in the invention include rod-like or discotic compounds and positive-birefringence compounds. Examples of the rod-like or discotic compound include compounds having at least two aromatic rings, and are preferably used as a retardation enhancer. An amount of the rod-like compound is preferably from 0.1 to 30 parts by mass, and more preferably from 0.5 to 20 parts by mass with respect to 100 parts by mass of the polymer ingredients including cellulose acylate. An amount of the discotic compound is preferably from 0.05 to 20 parts by mass, more preferably from 0.1 to 15 parts by mass, and much more preferably from 0.1 to 10 parts by mass with respect to 100 parts by mass of the cellulose acylate.

The discotic compound is more excellent than the rod-like compound in terms of enhancing Rth retardation; and when especially high Rth retardation is required, the discotic compound is preferably used. Plural types of the compounds may be used as a retardation enhancer.

The retardation enhancer preferably has a maximum absorption within the wavelength range of from 250 to 400 nm, and preferably has no absorption within the visible-light range substantially.

Examples of the retardation enhancer include compound (1)-(3) as follows.

(1) Discotic Compound

The discotic compound is described in detail. As the discotic compound, compounds having at least two aromatic rings may be used.

In the description, the term "aromatic ring" means not only an aromatic hydrocarbon ring but also an aromatic hetero ring. Examples of the discotic compound which can be used in the invention include those described in JP-A 2008-181105, [0038]-[0046].

Examples of the discotic compound which can be used as a material of the retardation film constituting the retardation region include the compounds represented by formula (I) below.

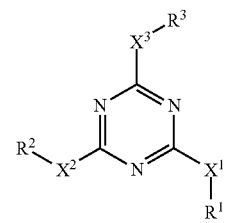
(I)

In the formula, $X^1$ represents a single bond, $-NR^4-$, $-O-$ or $-S-$; $X^2$ represents a single bond, $-NR^5-$, $-O-$ or $-S-$; $X^3$ represents a single bond, $-NR^6-$, $-O-$ or $-S-$. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

Preferred examples, I-(1) to IV-(10), of the compound represented by formula (I) include, but are not limited to, those shown below.

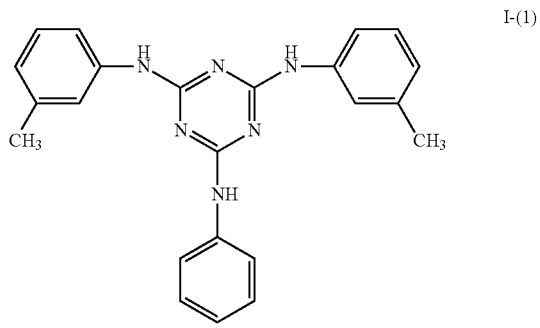
I-(1)

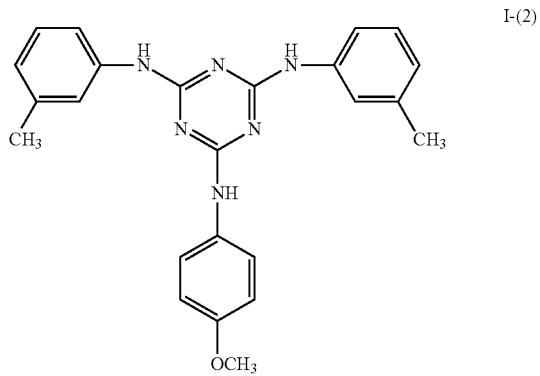
I-(2)

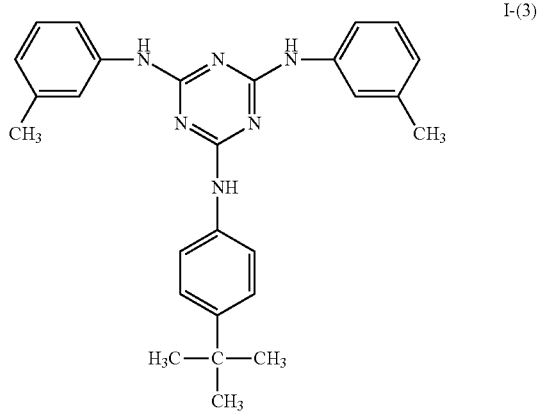
I-(3)

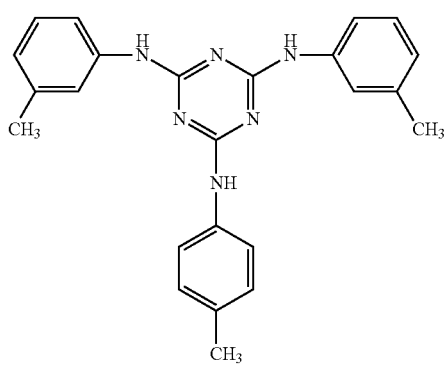
I-(4)
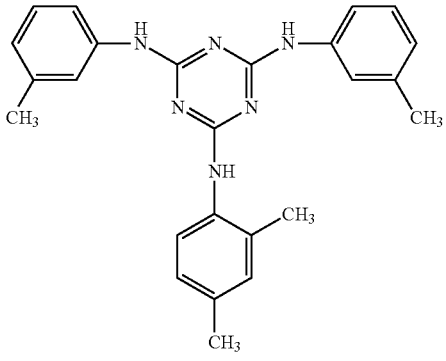
I-(8)
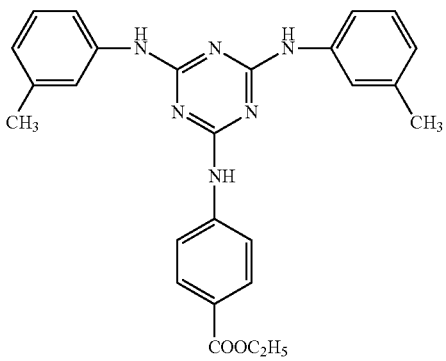
I-(5)
I-(9)
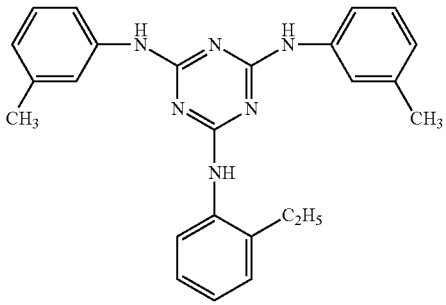
I-(6)
I-(10)
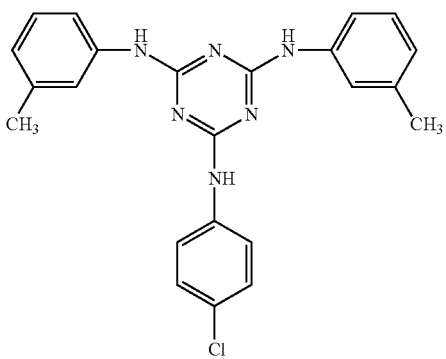
I-(7)
I-(11)

-continued
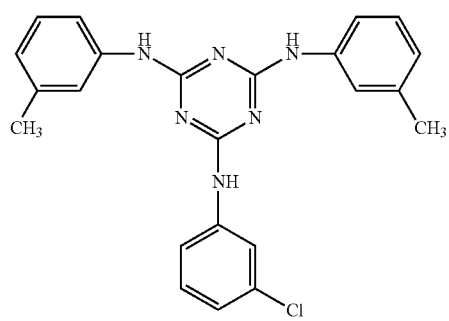
I-(12)
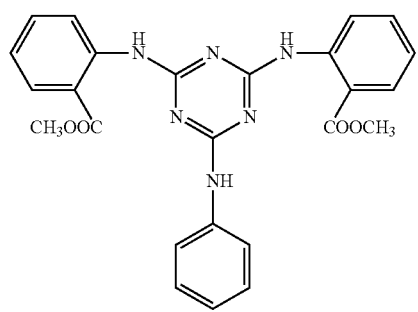
I-(13)
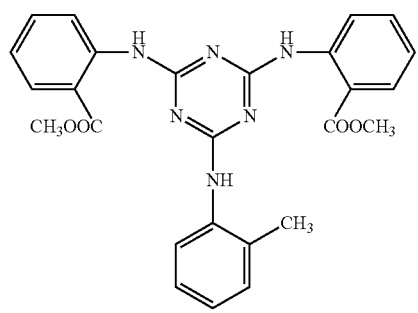
I-(14)
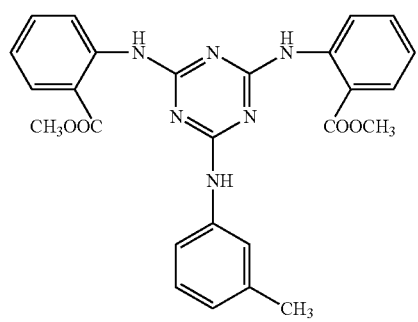
I-(15)
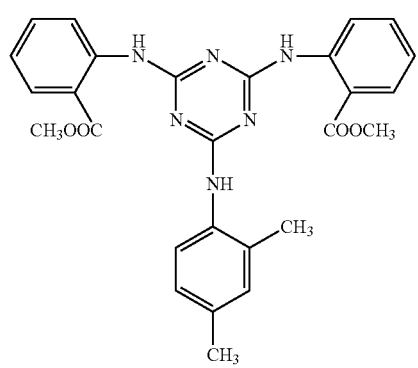
I-(16)
-continued
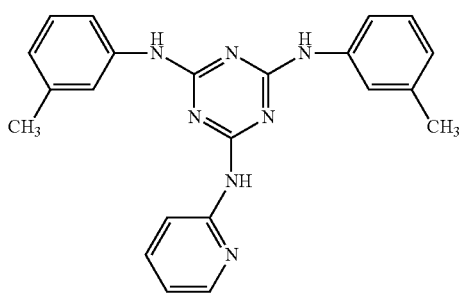
I-(17)
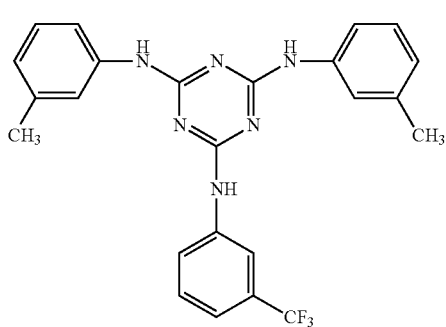
I-(18)
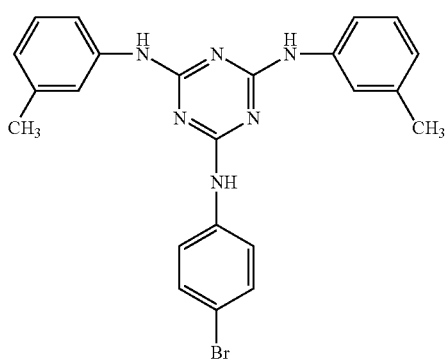
I-(19)
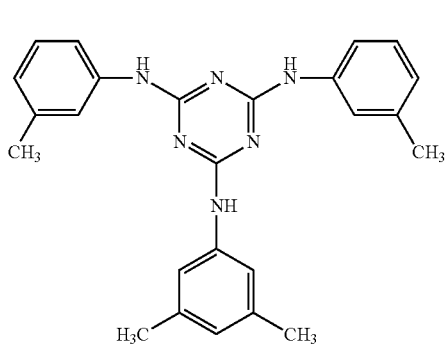
I-(20)

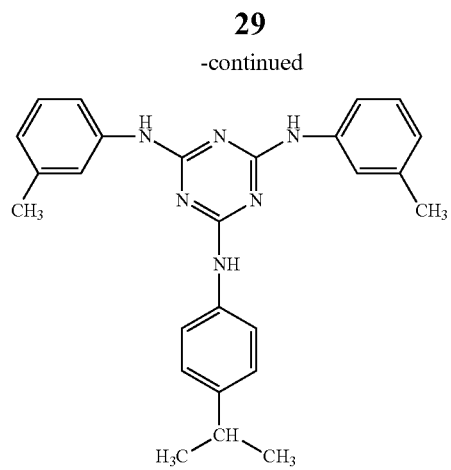
I-(21)
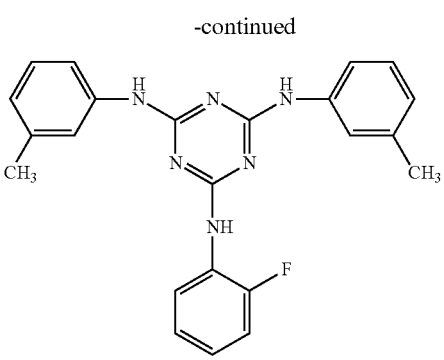
I-(25)
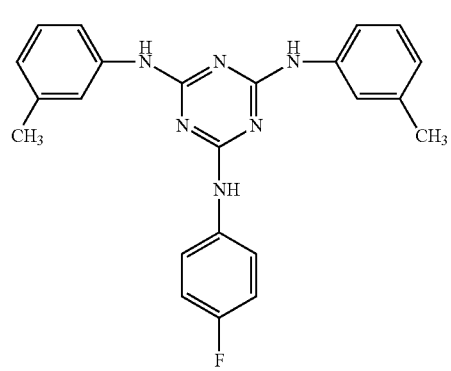
I-(22)
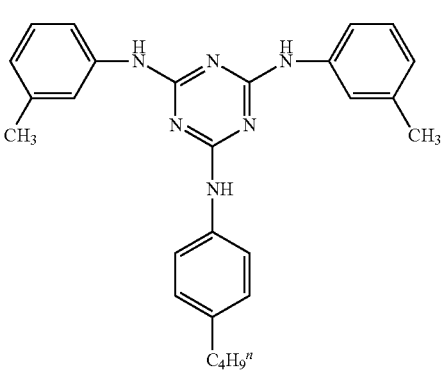
I-(26)
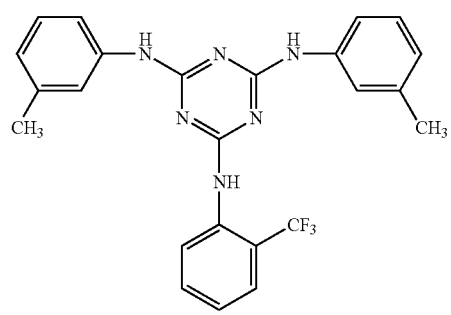
I-(23)
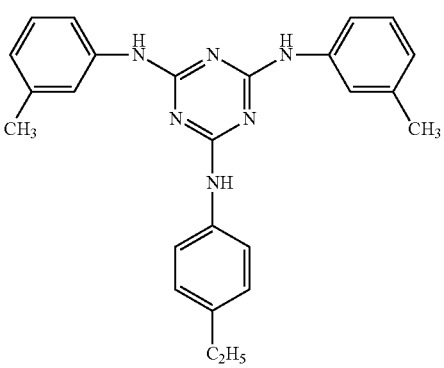
I-(27)
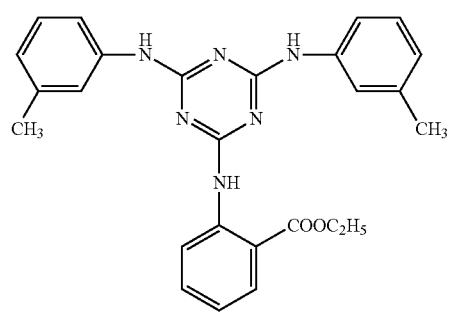
I-(24)
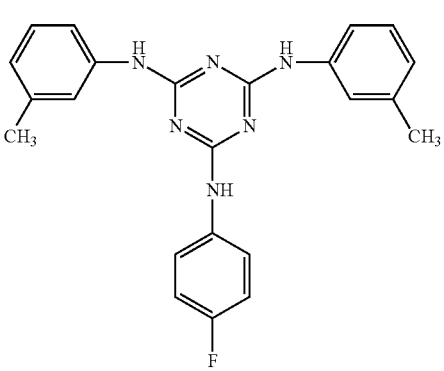
I-(28)

I-(29) 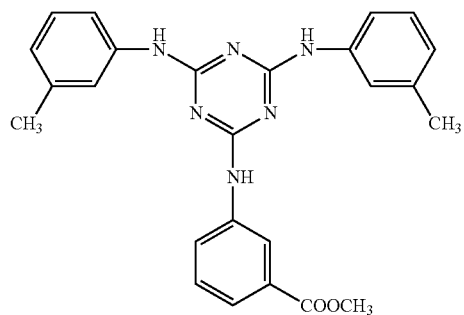
I-(30) 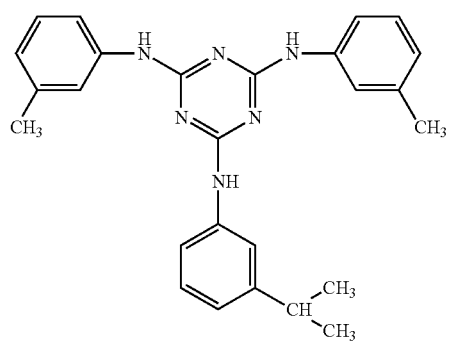
I-(31) 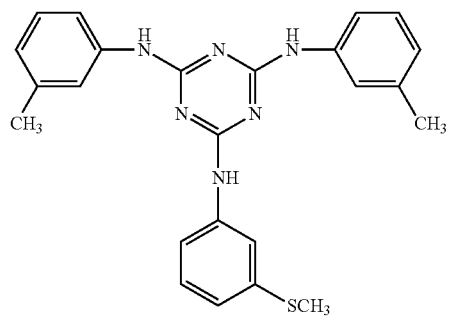
I-(32) 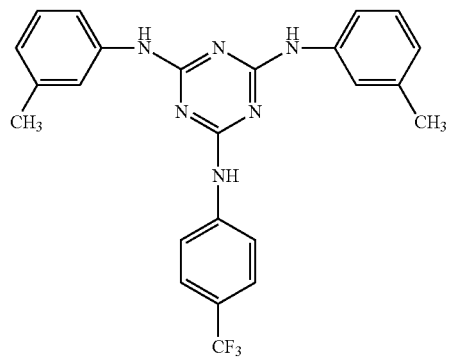
I-(33) 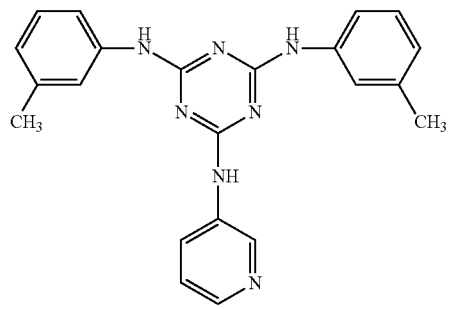
I-(34) 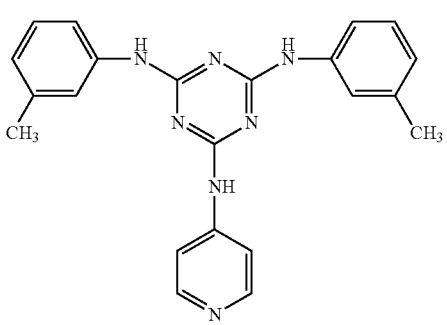
I-(35) 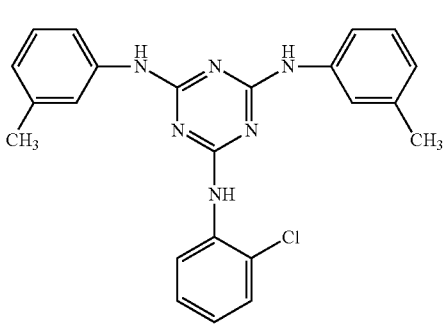
I-(36) 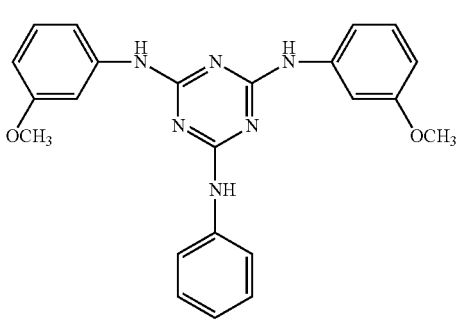
I-(37) 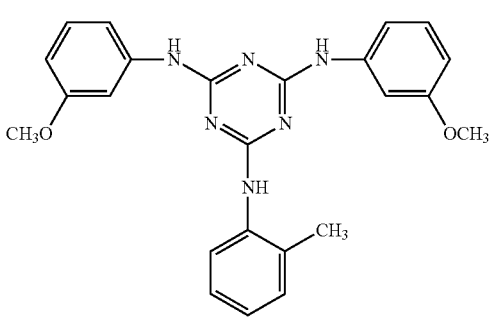
I-(38) 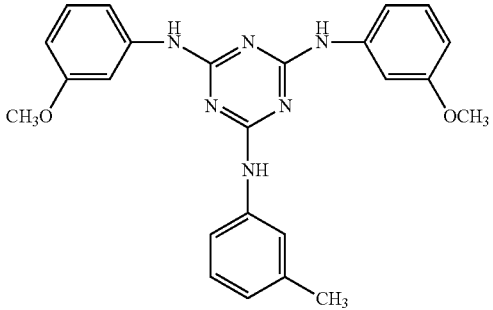

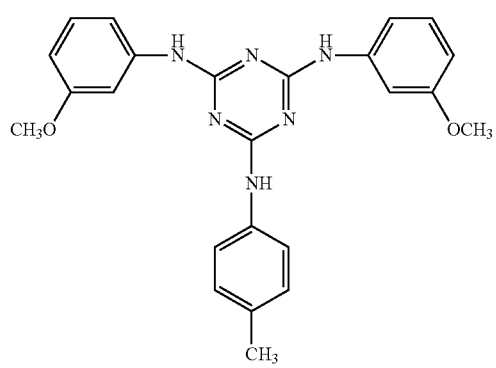
I-(39)
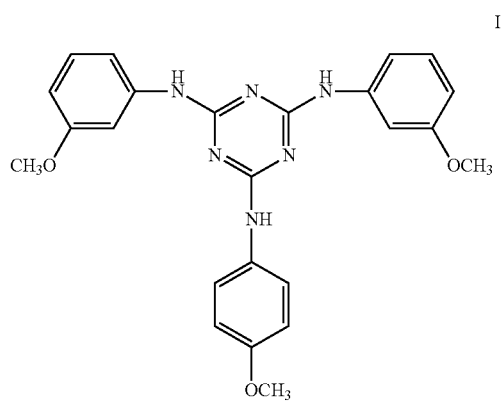
I-(40)
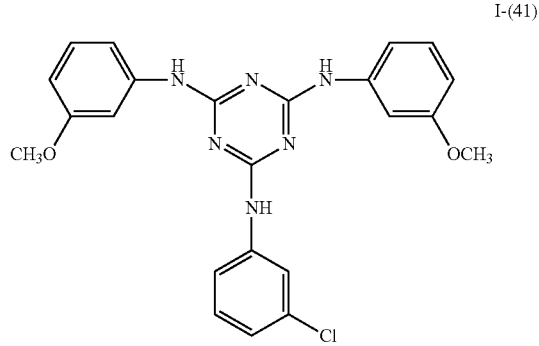
I-(41)
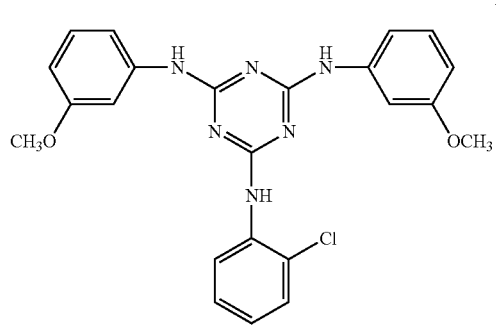
I-(42)
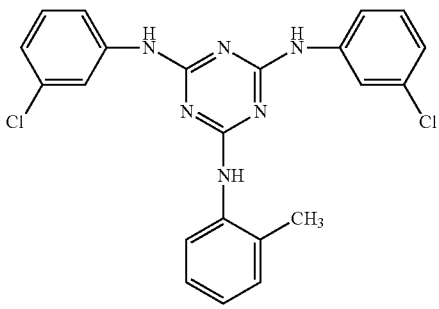
I-(43)
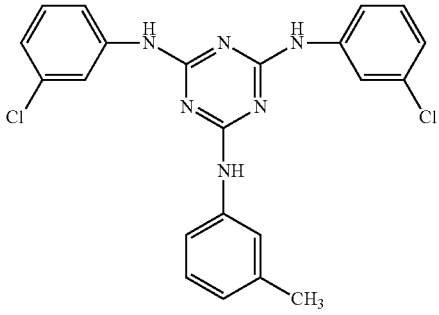
I-(44)
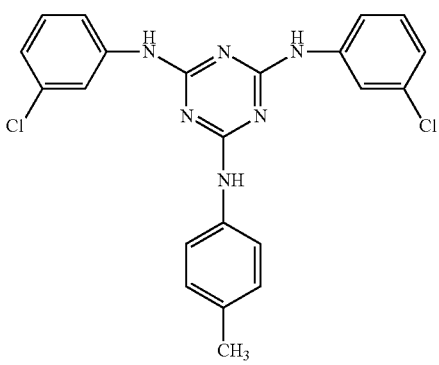
I-(45)
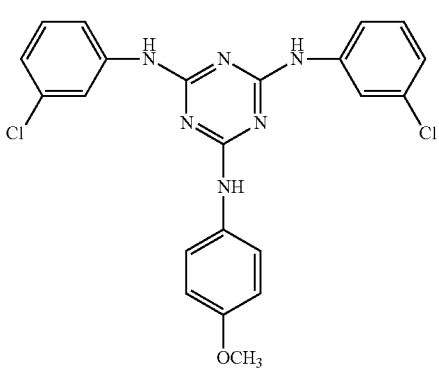
I-(46)

I-(47)
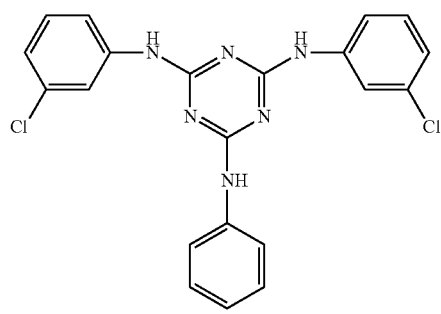
I-(48)
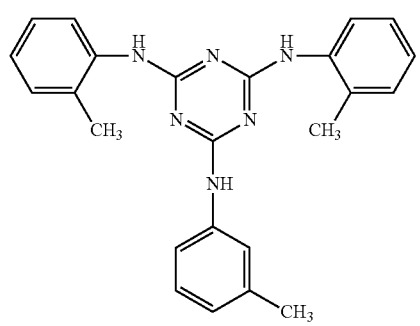
I-(49)
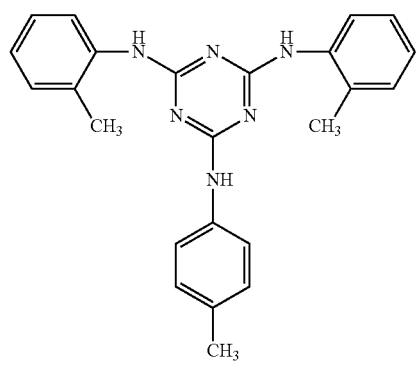
I-(50)
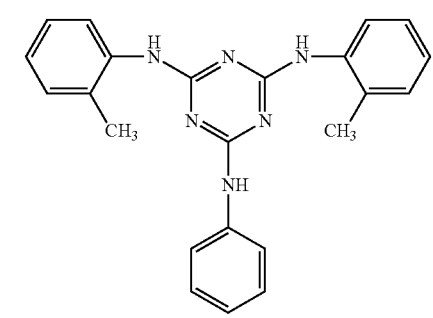
II-(1)
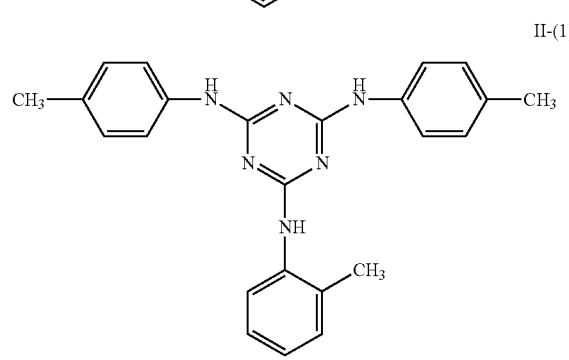
II-(2)
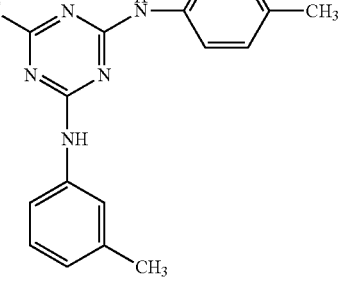
II-(3)
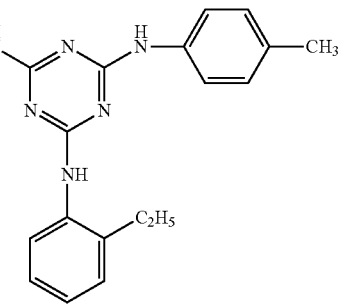
II-(4)
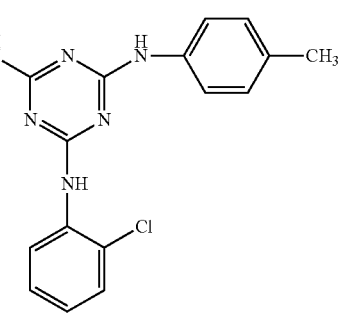
II-(5)
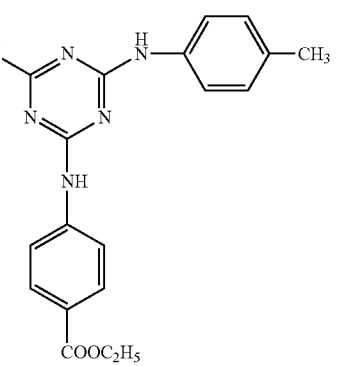

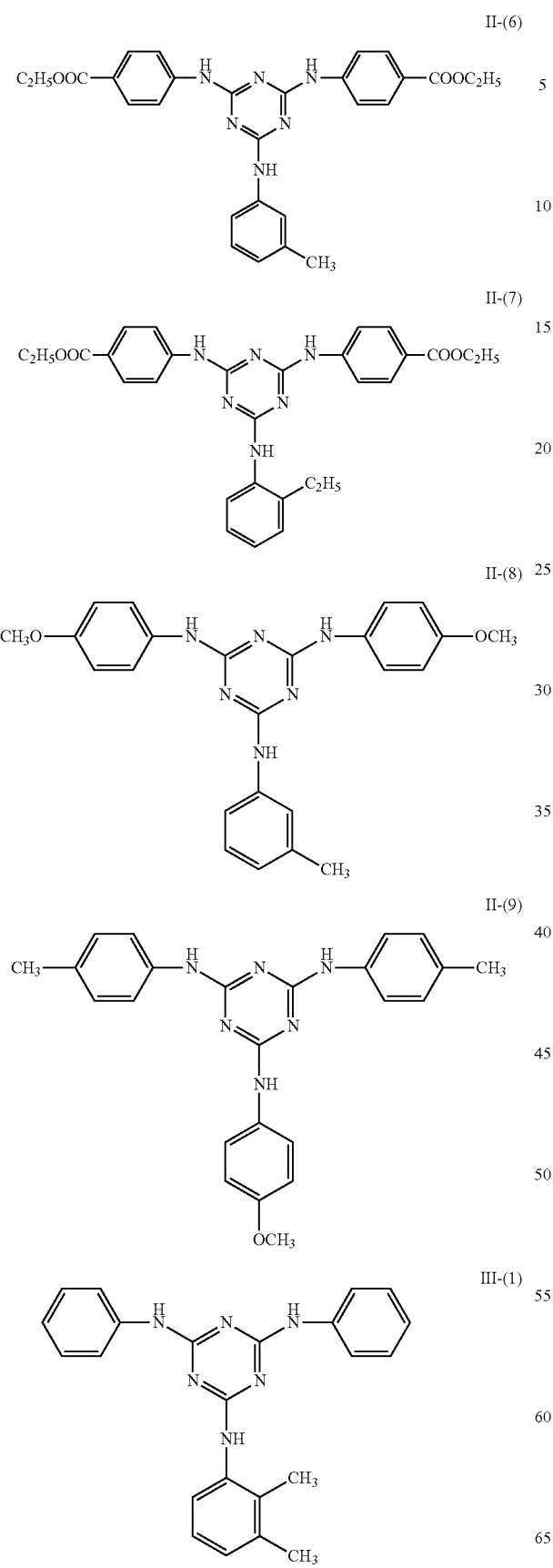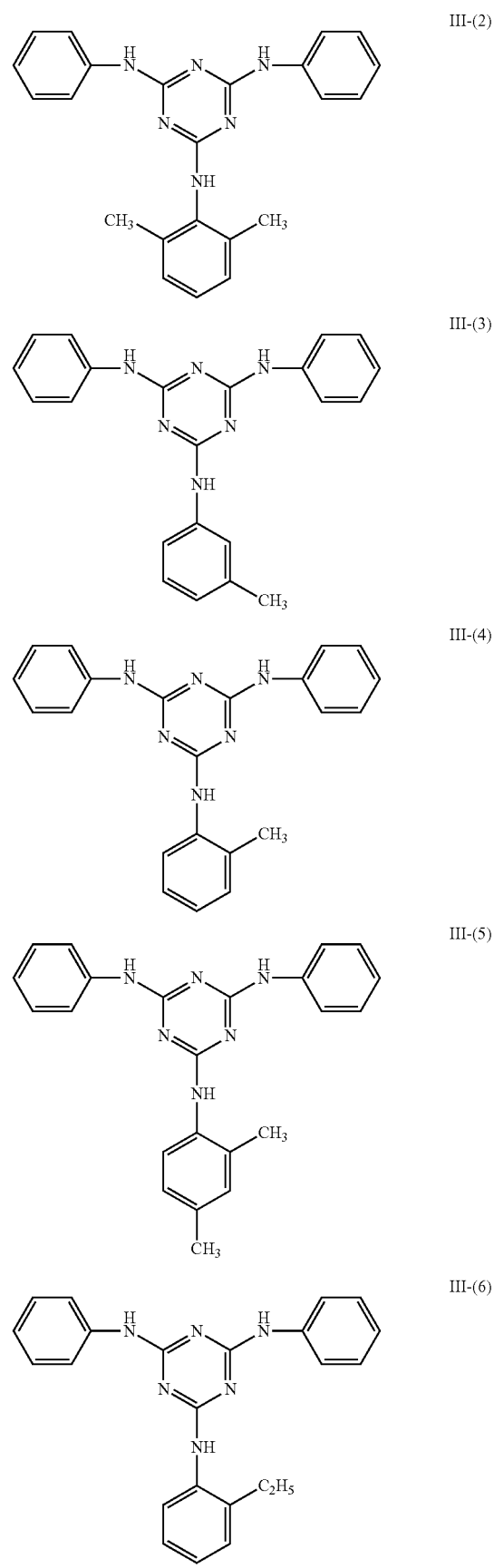

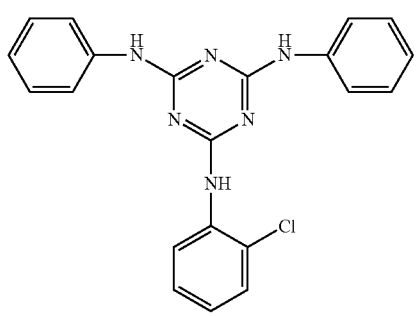
III-(7)
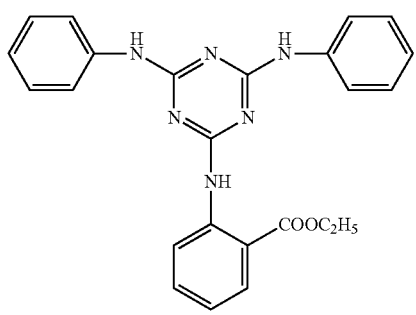
III-(8)
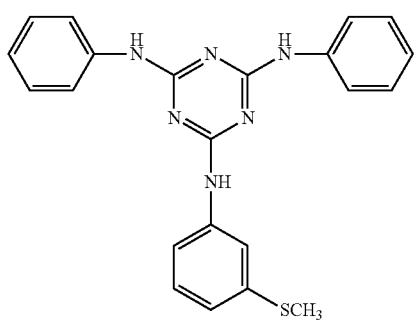
III-(9)
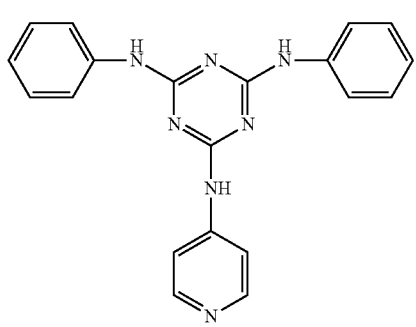
III-(10)
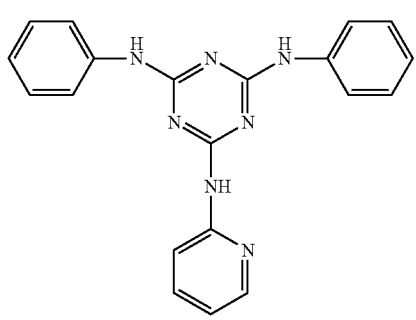
III-(11)
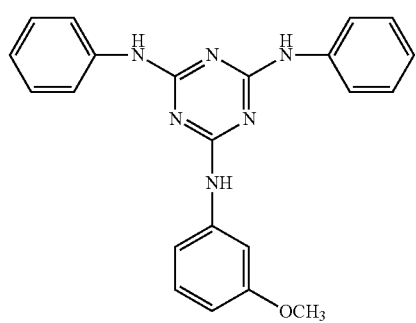
III-(12)
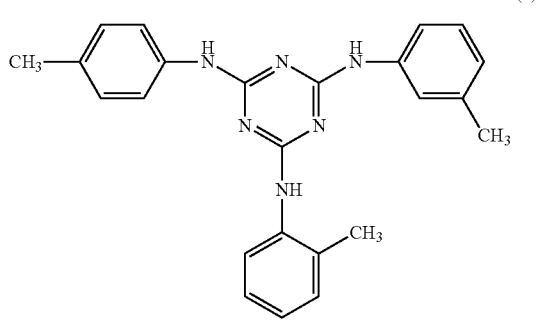
IV-(1)
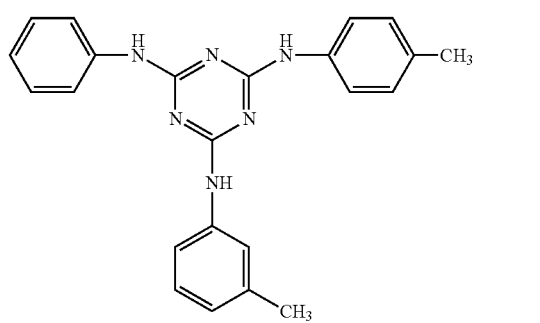
IV-(2)
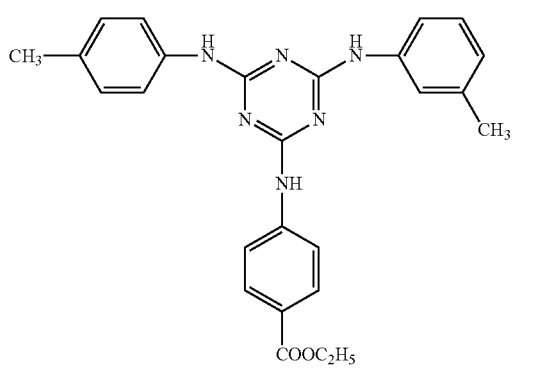
IV-(3)

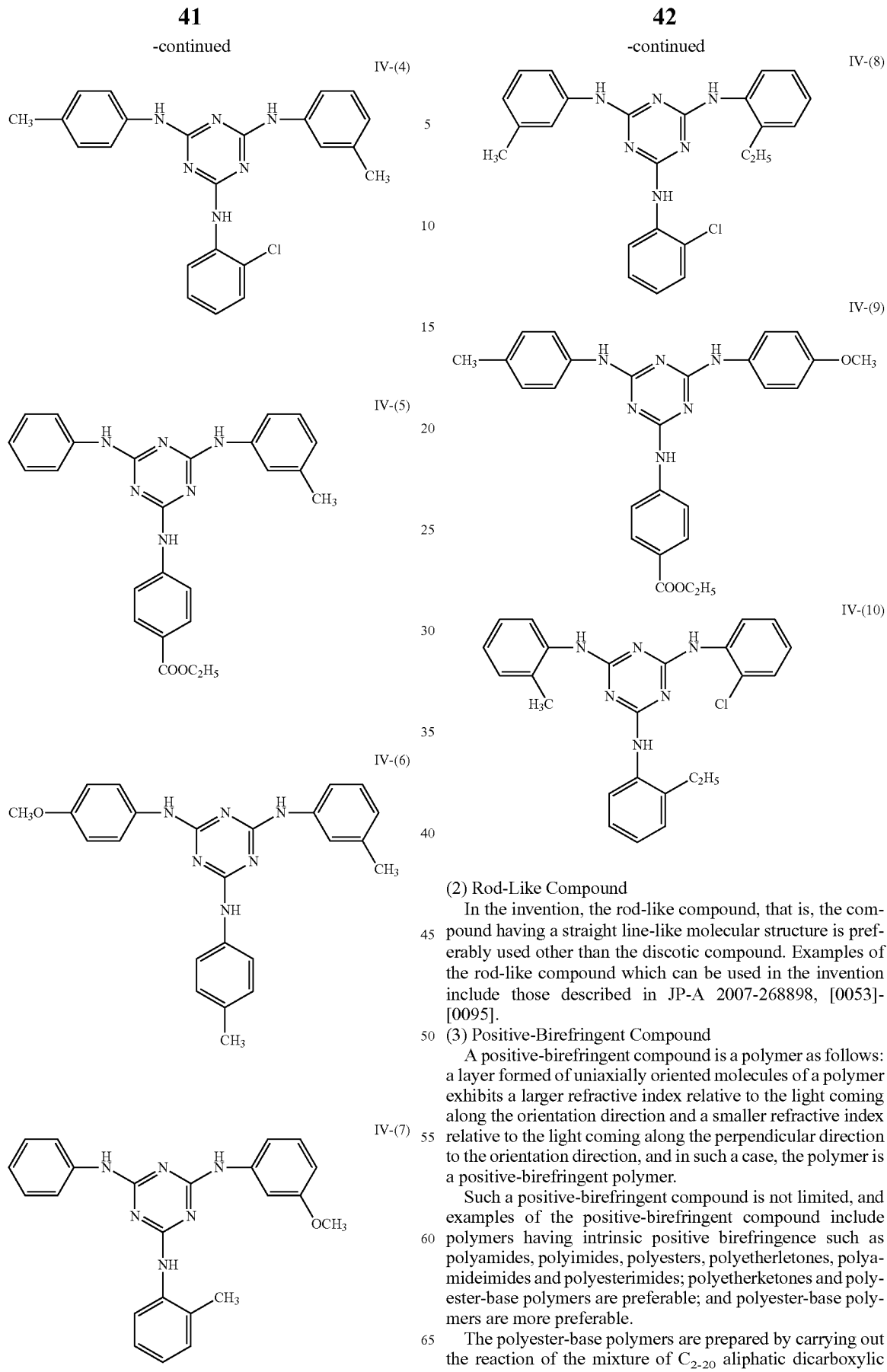

(2) Rod-Like Compound

In the invention, the rod-like compound, that is, the compound having a straight line-like molecular structure is preferably used other than the discotic compound. Examples of the rod-like compound which can be used in the invention include those described in JP-A 2007-268898, [0053]-[0095].

(3) Positive-Birefringent Compound

A positive-birefringent compound is a polymer as follows: a layer formed of uniaxially oriented molecules of a polymer exhibits a larger refractive index relative to the light coming along the orientation direction and a smaller refractive index relative to the light coming along the perpendicular direction to the orientation direction, and in such a case, the polymer is a positive-birefringent polymer.

Such a positive-birefringent compound is not limited, and examples of the positive-birefringent compound include polymers having intrinsic positive birefringence such as polyamides, polyimides, polyesters, polyetherletones, polyamideimides and polyesterimides; polyetherketones and polyester-base polymers are preferable; and polyester-base polymers are more preferable.

The polyester-base polymers are prepared by carrying out the reaction of the mixture of $C_{2-20}$ aliphatic dicarboxylic acids and $C_{8-20}$ aromatic dicarboxylic acids with at least one diol selected from $C_{2-12}$ aliphatic diols, $C_{4-20}$ alkylether diols and $C_{6-20}$ aromatic diols. If necessary, the both terminals of the products may be blocked by carrying out the reaction with mono carboxylic acid, mono alcohol or phenol. Blocking the terminal may be carried out for avoiding contamination of any free carboxylic acid, and is preferable in terms of preservation stability. The dicarboxylic acids which can be used for preparing the polyester-base polymers are preferably $C_{4-20}$ aliphatic dicarboxylic acids or $C_{8-20}$ aromatic dicarboxylic acids.

Examples of the preferable $C_{2-20}$ aliphatic dicarboxylic acids which can be used preferable include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexane dicarboxylic acid.

Examples of $C_{8-20}$ aromatic dicarboxylic acid include phthalic acid, terephthalic acid, isophthalic acid, 1,5-naphtharene dicarboxylic acid, 1,4-naphtharene dicarboxylic acid, 1,8-naphtharene dicarboxylic acid, 2,8-naphtharene dicarboxylic acid and 2,6-naphtharene dicarboxylic acid.

Among these aliphatic dicarboxylic acids, malonic acid, succinic acid, maleic acid, fumaric acid, glutaric acid, adipic acid, azelaic acid and 1,4-cyclohexane dicarboxylic acid are preferable; and among these aromatic dicarboxylic acids, phthalic acid, terephthalic acid, isophthalic acid, 1,5-naphtharene dicarboxylic acid and 1,4-naphtharene dicarboxylic acid are preferable. Among these aliphatic dicarboxylic acids, succinic acid, glutaric acid and adipic acid are especially preferable; and among these aromatic dicarboxylic acids, phthalic acid, terephthalic acid and isophthalic acid are especially preferable.

Any combination of the above-described aliphatic dicarboxylic acid and aromatic dicarboxylic acid may be used, and the combination is not especially limited. Plural types of them may be combined respectively.

The diol or aromatic diol which can be used in the positive birefringent compound may be, for example, selected from $C_{2-20}$ aliphatic diols, $C_{4-20}$ alkylether diols and $C_{6-20}$ aromatic diols Examples of $C_{2-20}$ aliphatic diol include alkyl diols and alicyclic diols such as ethane diol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol(neopentyl glycol), 2,2-diethyl-1,3-propanediol (3,3-dimethyrol pentane), 2-n-butyl-2-ethyl-1,3-propanediol (3,3-dimethyrol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used alone or in combination with other(s).

Ethane diol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol and 1,4-cyclohexane dimethanol are preferable; and ethane diol, 1,2-propanediol, 1,3-propanediol, 1,2-butanediol, 1,3-butanediol, 1,4-butanediol, 1,5-pentanediol, 1,6-hexanediol, 1,4-cyclohexane diol and 1,4-cyclohexane dimethanol are especially preferable.

Preferable examples of $C_{4-20}$ alkylether diol include polytetramethylene ether glycol, polyethylene ether glycol, polypropylene ether glycol and any combinations thereof. The averaged polymerization degree is especially not limited, and preferably from 2 to 20, more preferably from 2 to 10, much more preferably from 2 to 5 and especially preferably from 2 to 4. Examples of such a compound include useful commercially-available polyether glycols such as Carbowax resins, Pluronics resins and Niax resins.

Examples of $C_{6-20}$ aromatic diol include, however are not limited, bisphenol A, 1,2-hydroxy benzene, 1,3-hydroxy benzene, 1,4-hydroxy benzene and 1,4-benzene dimethanol. Bisphenol A, 1,4-hydroxy benzene and 1,4-benzene dimethonal are preferable.

The positive birefringent compound is preferably the compound of which terminals are blocked by any alkyl or aryl group. Protecting the terminals with any hydrophobic group is effective for preventing time degradation under a condition of a high temperature and a high humidity, and this is because it may play a role of prolonging hydrolysis of ester groups.

For avoiding terminal OH or carboxylic acid in the positive birefringent compound, the terminal is preferably blocked with a monoalcohol residue or a monocarboxylic acid residue.

As the monoalcohol, $C_{1-30}$ substituted or non-substituted monoalcohols are preferable, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodeca hexanol, dodeca octanol, allyl alcohol and oleyl alcohol; and substituted alcohols such as benzyl alcohol and 3-phenyl propanol.

Preferable examples of the alcohol which can be used for blocking the terminals include methanol ethanol, propanol, isopropanol, butanol, isobutanol, pentanol, isopentanol, hexanol, isohexanol, cyclohexyl alcohol, isooctanol, 2-ethylhexyl alcohol, isononyl alcohol, oleyl alcohol and benzyl alcohol: and much more preferable examples thereof include methanol ethanol, propanol, isobutanol, cyclohexyl alcohol, 2-ethylhexyl alcohol, isononyl alcohol and benzyl alcohol.

When a monocarboxylic acid residue is used for blocking the terminals, monocarboxylic acid, which is used as a monocarboxylic acid residue, is preferably $C_{1-30}$ substituted or non-substituted monocarboxylic acid. It may be an aliphatic monocarboxylic acid or aromatic monocarboxylic acid. Preferable examples of the aliphatic monocarboxylic acid include acetic acid, propionic acid, butane acid, caprylic acid, caproic acid, decane acid, dodecane acid, stearic acid and oleic acid; and preferable examples of the aromatic monocarboxylic acid include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used alone or in combination with other(s).

The positive birefringent compound can be produced with ease according to any conventional method, for example, according to a polyesterification, interesterification or thermal-fusing condensation method of a dicarboxylic acid component and a diol component and/or a monocarboxulic acid or monoalcohol for blocking terminals, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A Nos. 5-155809, 5-155810, 5-197073, 2006-259494, 7-330670, 2006-342227, and 2007-3679.

Examples of the positive birefringent compound include, however are not limited to, those shown below.

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-1 | — | AA | 100 | Ethane diol | hydroxyl | 1000 |
| P-2 | — | AA | 100 | Ethane diol | hydroxyl | 2000 |
| P-3 | — | AA | 100 | Propane diol | hydroxyl | 2000 |
| P-4 | — | AA | 100 | Butane diol | hydroxyl | 2000 |
| P-5 | — | AA | 100 | Hexane diol | hydroxyl | 2000 |
| P-6 | — | AA/SA | 60/40 | Ethane diol | hydroxyl | 900 |
| P-7 | — | AA/SA | 60/40 | Ethane diol | hydroxyl | 1500 |
| P-8 | — | AA/SA | 60/40 | Ethane diol | hydroxyl | 1800 |
| P-9 | — | SA | 100 | Ethane diol | hydroxyl | 1500 |
| P-10 | — | SA | 100 | Ethane diol | hydroxyl | 2300 |
| P-11 | — | SA | 100 | Ethane diol | hydroxyl | 6000 |
| P-12 | — | SA | 100 | Ethane diol | hydroxyl | 1000 |
| P-13 | PA | SA | 50/50 | Ethane diol | hydroxyl | 1000 |
| P-14 | PA | SA | 50/50 | Ethane diol | hydroxyl | 1800 |
| P-15 | PA | AA | 50/50 | Ethane diol | hydroxyl | 2300 |
| P16 | PA | SA/AA | 40/30/30 | Ethane diol | hydroxyl | 1000 |
| P-17 | PA | SA/AA | 50/20/30 | Ethane diol | hydroxyl | 1500 |
| P-18 | PA | SA/AA | 50/30/20 | Ethane diol | hydroxyl | 2600 |
| P-19 | TPA | SA | 50/50 | Ethane diol | hydroxyl | 1000 |
| P-20 | TPA | SA | 50/50 | Ethane diol | hydroxyl | 1200 |
| P-21 | TPA | AA | 50/50 | Ethane diol | hydroxyl | 2100 |
| P-22 | TPA | SA/AA | 40/30/30 | Ethane diol | hydroxyl | 1000 |
| P-23 | TPA | SA/AA | 50/20/30 | Ethane diol | hydroxyl | 1500 |
| P-24 | TPA | SA/AA | 50/30/20 | Ethane diol | hydroxyl | 2100 |
| P-25 | PA/TPA | AA | 15/35/50 | Ethane diol | hydroxyl | 1000 |
| P-26 | PA/TPA | AA | 20/30/50 | Ethane diol | hydroxyl | 1000 |
| P-27 | PA/TPA | SA/AA | 15/35/20/30 | Ethane diol | hydroxyl | 1000 |
| P-28 | PA/TPA | SA/AA | 20/30/20/30 | Ethane diol | hydroxyl | 1000 |
| P-29 | PA/TPA | SA/AA | 10/50/30/10 | Ethane diol | hydroxyl | 1000 |
| P-30 | PA/TPA | SA/AA | 5/45/30/20 | Ethane diol | hydroxyl | 1000 |
| P-31 | — | AA | 100 | Ethane diol | acetyl ester residue | 1000 |
| P-32 | — | AA | 100 | Ethane diol | acetyl ester residue | 2000 |
| P-33 | — | AA | 100 | Propane diol | acetyl ester residue | 2000 |
| P-34 | — | AA | 100 | Butane diol | acetyl ester residue | 2000 |
| P-35 | — | AA | 100 | Hexane diol | acetyl ester residue | 2000 |
| P-36 | — | AA/SA | 60/40 | Ethane diol | acetyl ester residue | 900 |
| P-37 | — | AA/SA | 60/40 | Ethane diol | acetyl ester residue | 1000 |
| P-38 | — | AA/SA | 60/40 | Ethane diol | acetyl ester residue | 2000 |
| P-39 | | SA | 100 | Ethane diol | acetyl ester residue | 1000 |
| P-40 | — | SA | 100 | Ethane diol | acetyl ester residue | 3000 |
| P-41 | — | SA | 100 | Ethane diol | acetyl ester residue | 5500 |
| P42 | — | SA | 100 | Ethane diol | acetyl ester residue | 1000 |
| P-43 | PA | SA | 50/50 | Ethane diol | acetyl ester residue | 1000 |
| P-44 | PA | SA | 50/50 | Ethane diol | acetyl ester residue | 1500 |
| P-45 | PA | AA | 50/50 | Ethane diol | acetyl ester residue | 2000 |
| P-46 | PA | SA/AA | 40/30/30 | Ethane diol | acetyl ester residue | 1000 |
| P-47 | PA | SA/AA | 33/33/34 | Ethane diol | benzoic acid | 1000 |
| P-48 | PA | SA/AA | 50/20/30 | Ethane diol | acetyl ester residue | 1500 |
| P-49 | PA | SA/AA | 50/30/20 | Ethane diol | acetyl ester residue | 2000 |
| P-50 | TPA | SA | 50/50 | Ethane diol | acetyl ester residue | 1000 |
| P-51 | TPA | SA | 50/50 | Ethane diol | acetyl ester residue | 1500 |
| P-52 | TPA | SA | 45/55 | Ethane diol | acetyl ester residue | 1000 |
| P-53 | TPA | AA | 50/50 | Ethane diol | acetyl ester residue | 2200 |
| P-54 | TPA | SA | 35/65 | Ethane diol | acetyl ester residue | 1000 |
| P-55 | TPA | SA/AA | 40/30/30 | Ethane diol | acetyl ester residue | 1000 |
| P-56 | TPA | SA/AA | 50/20/30 | Ethane diol | acetyl ester residue | 1500 |
| P-57 | TPA | SA/AA | 50/30/20 | Ethane diol | acetyl ester residue | 2000 |
| P-58 | TPA | SA/AA | 20/20/60 | Ethane diol | acetyl ester residue | 1000 |
| P-59 | PA/TPA | AA | 15/35/50 | Ethane diol | acetyl ester residue | 1000 |
| P-60 | PA/TPA | AA | 25/25/50 | Ethane diol | acetyl ester residue | 1000 |
| P-61 | PA/TPA | SA/AA | 15/35/20/30 | Ethane diol | acetyl ester residue | 1000 |
| P-62 | PA/TPA | SA/AA | 20/30/20/30 | Ethane diol | acetyl ester residue | 1000 |
| P-63 | PA/TPA | SA/AA | 10/50/30/10 | Ethane diol | acetyl ester residue | 1000 |
| P-64 | PA/TPA | SA/AA | 5/45/30/20 | Ethane diol | acetyl ester residue | 1000 |
| P-65 | PA/TPA | SA/AA | 5/45/20/30 | Ethane diol | acetyl ester residue | 1000 |
| P-66 | IPA | AA/SA | 20/40/40 | Ethane diol | acetyl ester residue | 1000 |

-continued

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-67 | 2,6-NPA | AA/SA | 20/40/40 | Ethane diol | acetyl ester residue | 1200 |
| P-68 | 1,5-NPA | AA/SA | 20/40/40 | Ethane diol | acetyl ester residue | 1200 |
| P-69 | 1,4-NPA | AA/SA | 20/40/40 | Ethane diol | acetyl ester residue | 1200 |
| P-70 | 1,8-NPA | AA/SA | 20/40/40 | Ethane diol | acetyl ester residue | 1200 |
| P-71 | 2,8-NPA | AA/SA | 20/40/40 | Ethane diol | acetyl ester residue | 1200 |

In Tables, PA means phthalic acid; TPA means terephthalic acid; IPA means isophthalic acid; AA means adipic acid; SA means succinic acid; 2,6-NPA means 2,6-naphthalene dicarboxylic acid; 2,8-NPA means 2,8-naphthalene dicarboxylic acid; 1,5-NPA means 1,5-naphthalene dicarboxylic acid; 1,4-NPA means 1,4-naphthalene dicarboxylic acid; and 1,8-NPA means 1,8-naphthalene dicarboxylic acid.

An amount of such the positive birefringent compound is preferably from 1 to 30 parts by mass, more preferably from 4 to 25 parts by mass and much more preferably from 10 to 20 parts by mass with respect to 100 part by mass of the cellulose acylate.

The cellulose acylate solution to be used for preparing the cellulose acylate-base film may be added with any additive other than the retardation enhancer. Examples of another additive include antioxidants, UV inhibitors, peeling promoters, plasticizers, agents for controlling wavelength-dispersion, fine particles and agents for controlling optical properties. They may be selected from any known additives.

The cellulose acylate solution for the rear-side or front-side retardation region may be added with any plasticizer in order to improve the mechanical properties of the prepared film or the drying rate. Examples of the plasticizer which can be used in the invention include those described in JP-A 2008-181105, [0067].

For preparing the cellulose acylate-base film satisfying the formula (Ia), one or more additives described in JP-A 2006-184640, [0026]-[0218] may be used. The preferred range of the additive is as same as that described in the publication.

Acryl-Base Polymer Film:

The acryl-base polymer film which can be used in the invention may be formed of a polymer composition containing (met)acryl-base polymer as a major ingredient. A (met)acryl-base polymer tend to exhibit negative photoelastic coefficient, and is preferable. Examples of the (met)acryl-base polymer which can be used in the invention include, but are not limited, polyacrylates, polymethacrylates, methyl methacrylate-acrylic acid copolymers, methyl methacrylate-methacrylic acid copolymers, methyl methacrylate-acrylate copolymers, methyl methacrylate-methacrylate copolymers, methyl methacrylate-acrylate-acrylic acid copolymers, methyl methacrylate-acrylate-methacrylic acid copolymers, methyl acrylate-styrene copolymers, methyl methacrylate-styrene copolymers (MS resins), polymers having alicyclic hydrocarbon group(s) (including methyl methacrylate-cyclohexyl methacrylate copolymers, methyl methacrylate-norbornyl acrylate copolymers and methyl methacrylate-norbornyl methacrylate copolymer).

Among the above polymers, $C_{1-6}$ alkyl acrylate polymers, $C_{1-6}$ methacrylate polymers, and methyl methacrylate-base polymers are preferable. Preferable examples of the methyl methacrylate base polymer include any polymers having the unit derived from methyl methacrylate in an amount of from 50 to 100% by mass, more preferably from 70 to 100% by mass, with respect to the total mass of the units in the polymer. Examples of the (meth)acryl-base polymer which can be used in the invention are described in JP-A- 2008-231234 and 2008-9378 in detail.

Examples of the (meth)acryl-base polymer include commercially available polymers such as "ACRYPET VH" and "ACRYPET VRL20A" (trade names; manufactured by Mitsubishi Rayon Co., Ltd.), acryl-base and methacryl-base polymers having a ring structure in its molecule which are described in JP-A-2004-70296, and acryl-base and methacryl-base polymers having a high Tg obtained by intramolecular cross-linking or intramolecular cyclization reaction.

Among the (meth)acryl-base polymers, (meth)acryl-base polymers, having at least one of a lactone ring unit, maleic anhydride unit, glutaric anhydride unit and glutarimide unit are preferable. These polymers are excellent in heat-resistance, transparency and mechanical strength due to the ring structure in their molecules.

Examples of the (meth)acryl-base polymer having a lactone ring unit include the polymers having the ring structure represented by formula (17).

(17)

In the formula, $R^{11}$, $R^{12}$ and $R^{13}$ each independently represent a hydrogen atom, or an organic residue having from 1 to 20 carbon atoms. The organic residue may contain an oxygen atom.

Examples of the (meth)acryl-base polymer having the lactone ring unit include those described in JP-A-2000-230016, 2001-151814, 2002-120326, 2002-254544, 2005-146084 and 2006-171464.

Examples of the maleic anhydride unit include the structure represented by formula (18).

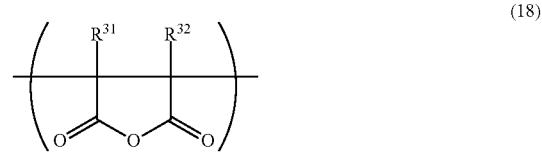

(18)

In formula (18), $R^{31}$ and $R^{32}$ independently each represent a hydrogen atom or a substituted or non-substituted $C_{1-5}$ alkyl group. Examples of the substituent of the substituted $C_{1-5}$ alkyl group include halogen atoms, —OH, —COON, —NH$_2$ and —SO$_3$H.

Examples of the (meth)acryl-base polymer having the maleic anhydride unit include those described in JP-A-2008-158165 and 2009-109695.

Examples of the glutaric anhydride unit unit include the structure represented by formula (19).

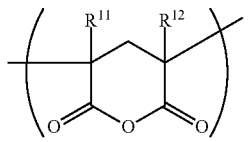

(19)

In formula (19), $R^{11}$ and $R^{12}$ independently each represent a hydrogen atom or a substituted or non-substituted $C_{1-5}$ alkyl group. Examples of the substituent of the substituted $C_{1-5}$ alkyl group include halogen atoms, —OH, —COOH, —NH$_2$ and —SO$_3$H.

Examples of the (meth)acryl-base polymer having the glutaric anhydride unit include those described in JP-A-2004-70290, 2004-70296, 2004-163924, 2004-292812, 2005-314534, 2006-206881, 2006-265532, 2006-283013, 2006-299005 and 2006-335902.

Examples of the (meth)acryl-base polymer having a glutarimide unit include the polymers having the ring structure represented by formula (20).

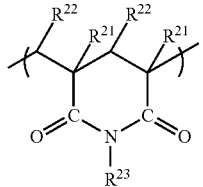

(20)

In formula (20), $R^{21}$ and $R^{22}$ independently each represent a hydrogen atom or a substituted or non-substituted $C_{1-8}$ alkyl group. $R^{23}$ represents a substituted or non-substituted $C_{1-18}$ alkyl group, a substituted or non-substituted $C_{3-12}$ cycloalkyl group or a substituted or non-substituted $C_{6-10}$ aryl group. Examples of the substituent of the substituted $C_{1-8}$ alkyl group include halogen atoms, —OH, —COOH, —NH$_2$ and —SO$_3$H. Examples of the substituent of the substituted $C_{1-18}$ alkyl group, $C_{3-12}$ cycloalkyl group or $C_{6-10}$ aryl group include halogen atoms, —OH, —COOH, —NH$_2$ and —SO$_3$H. Preferably, $R^{21}$ and $R^{22}$ independently each represent a hydrogen atom or methyl, and $R^{23}$ represents a hydrogen atom, methyl or cyclohexyl. More preferably, $R^{21}$ represents methyl, and $R^{22}$ represents a hydrogen atom. The polymers may have single or plural types, having different $R^{21}$, $R^{22}$ or $R^{23}$ from each other, of the repeating unit of (20).

Examples of the (meth)acryl-base polymer having the glutarimide unit include those described in JP-A-2006-309033, 2006-317560, 2006-328329, 2006-328334, 2006-337491, 2006-337492, 2006-337493 and 2006-337569.

It is to be noted that examples of the (meth)acryl-base polymer having the glutarimide unit include also any polymers obtained by imidization of polymers having a unit such as a methacrylate unit, which is capable of being imidized, with ammonia or substituted amine. Examples of such a polymer include glutarimide polymers described in U.S. Pat. Nos. 3,284,425 and 4,246,374, and JP-A2-153904.

The (meth)acryl-base polymer having the lactone ring unit, maleic anhydride unit, glutaric anhydride unit or glutarimide unit may have at least one unit along with the ring unit represented by formula (17), (18), (19) or (20). Examples of the unit other than the unit of formula (17), (18), (19) or (20) include, but are not limited, any units derived from (meth) acrylates, monomers having hydroxy and unsaturated carboxylic acids, and the units derived from the monomer represented by formula (21).

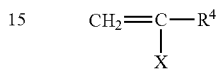

(21)

In formula (21), $R^4$ represents a hydrogen atom or methyl; X represents a hydrogen atom, $C_{1-20}$ alkyl, aryl, —OAc, —CN or —CO-R$^5$; Ac represents an acetyl; and $R^5$ represents a hydrogen atom or $C_{1-20}$ organic residue.

By addition of any cellulose acylate to the acryl-base polymer, the properties of the film may be adjusted to the preferred range due to the complementary action of the cellulose acylate, which is preferable. An amount of the cellulose acylate to be added to the film is preferably from about 5 to about 40% by mass with respect to the total mass of all of the polymers in the film. An acryl-base polymer film, usually, shows a low degree of moisture transmission, and therefore, after being bonded to a polarizer, the residual water in the film may be hardly removed. By addition of any cellulose acylate to the acryl-base polymer, the degree of moisture transmission of the film may be adjusted appropriately. Examples of such an embodiment include films added with cellulose acylate (for example, cellulose acetate prepared in Example 2) by an amount of 10% by mass, and films added with cellulose acylate propionate (for example, "CAP482-20" manufactured by Eastman Chemical) by an amount of 30% by mass.

Cycloolefin-Base Polymer Film:

Regarding the materials and methods employing the materials for preparing the cycloolefin-base polymer film, details are described in JP-A 2006-293342, [0098]-[0193], which can be referred to in the invention. Examples of the retardation film, constituting the rear-side or the front-side retardation region, include norbornene-base polymers such as ARTON (manufactured by JSR Corporation, and ZEONOR (manufactured by ZEON Corporation).

Polypropylene-Base Resin Film

The polypropylene-base resin film which can be used in the film consists of or contains one or more polypropylene-base resins. The film preferably contains one or more polypropylene-base resins as a major ingredient. If desired, the film may contain at least one additive described later. The polypropylene-base resin may be selected from homopolymers of propylene. The polypropylene-base resin may be selected also from any copolymers obtained by polymerization of propylene with any monomer(s) capable of co-polymerization with propylene. However, the major monomer thereof is preferably polypropylene. An amount of other monomer(s) to be co-polymerized with propylene is preferably smaller than that of propylene, more preferably equal to or smaller than 20% by mass, and even more preferably equal to or smaller than 10% by mass. The lowest limit of an amount of other monomer(s) is not limited, of course, can be 0% by mass, and may be equal to or larger than 1% by mass for obtaining the effect of the co-polymerized other monomer(s).

Examples of the monomer which can be co-polymerized with propylene include ethylene and $C_{4-20}$ α-olefins. Example of the $C_{4-20}$ α-olefin which can be used include 1-butene, 2-methyl-1-propane (these are examples of $C_4$ olefin); 1-pentene, 2-methyl-1-butene, 3-methyl-1-buten (these are examples of $C_5$ olefin); 1-hexene, 2-ethyl-1-butene, 2,3-dimethyl-1-butene, 2-methyl-1-pentene, 3-methyl-1-petene, 4-methyl-1-pentene, 3,3-dimethyl-1-butene (these are examples of $C_6$ olefin); 1-heptene, 2-methyl-1-hexene, 2,3-dimethyl-1-pentene, 2-ethyl-1-penetene, 2-methyl-3-ethyl-1-butene (these are examples of $C_7$ olefin); 1-octene, 5-methyl-1-heptene, 2-ethyl-1-hexene, 3,3dimethyl-1-hexene, 2-methyl-3-ethyl-1-pentene, 2,3,4-trimethyl-1-pentene, 2-propyl-1-pentnene, 2,3-diethyl-1-butene (these are examples of $C_8$ olefin); 1-nonene (this is an example of $C_9$ olefin); 1-decene (this is an example of $C_{10}$ olefin); 1-undecene (this is an example of $C_{11}$ olefin); 1-dodecene (this is an example of $C_{12}$ olefin); 1-tridecene (this is an example of $C_{13}$ olefin); 1-tetradecene (this is an example of $C_{14}$ olefin); 1-pentadecene (this is an example of $C_{15}$ olefin); 1-hexadecene (this is an example of $C_{16}$ olefin); 1-heptadecene (this is an example of $C_{17}$ olefin); 1-octadecene (this is an example of $C_{18}$ olefin); and 1-nonadecene (this is an example of $C_{19}$ olefin).

Among α-olefins, $C_{4-12}$ α-olefins are preferable, and examples of the $C_{4-12}$ α-olefin which can be used in the invention include 1-butene, 2-methyl-1-propane; 1-pentene, 2-methyl-1-butene, 3-methyl-1-butene; 1-hexene, 2-ethyl-1-butene, 2,3-dimethyl-1-butene, 2-methyl-1-pentene, 3-methyl-1-penetene, 4-methyl-1-penetne, 3,3-dimethyl-1-butene; 1-heptene, 2-methyl-1-hexene, 2,3-dimethyl-1-pentene, 2-ethyl-1-penetne, 2-methyl-3-ethyl-1-butene; 1-octane, 5-methyl-1-heptene, 2-ethyl-1-hexene, 3,3-dimethyl-1-hexene, 2-methyl-3-ethyl-1-pentene, 2,3,4-trimethyl-1-pentene, 2-propyl-1-pentene, 2,3-diethyl-1-butene; 1-nonene; 1-decene; 1-undecene; and 1-dodecene. In terms of co-polymerization ability, 1-butene, 1-pentene, 1-hexene and 1-octene are preferable; and especially, 1-butene and 1-hexene are more preferable.

The copolymer which can be used in the invention may be selected from random and block copolymers. Preferable examples of the copolymer include propylene/ethylene copolymers and propylene/1-butene copolymers. An amount of the ethylene or 1-butene unit in the propylene/ethylene or propylene/1-butene copolymer can be calculated on the basis of the infra-red (IR) spectrum data according to the method described in "Handbook of Polymer-Analysis" (published in 1995 by KINOKUNIYA), on page 616.

In terms of improving the transparency or workability of retardation films, random copolymers prepared by random co-polymerization of propylene, as a major monomer, with any unsaturated hydrocarbon(s) re preferably used. Among those, copolymers of propylene and ethylene are more preferable. A co-polymerization ratio of the monomer(s) other than propylene is preferably from about 1 to about 10% by mass, and more preferably from 3 to 7% by mass. By adjusting the ratio of the unit(s) other than the unit of propylene to the above range, transparency and workability of the film may be improved without remarkable lowering of heat resistance depending on lowering the melting point of the resin, which is preferable. Regarding any copolymers prepared by co-polymerization of propylene and two or more other monomers, it is preferable that the ratio of total of the other monomers is adjusted to the above range.

The polypropylene-base resin which can be used for preparing the polypropylene-base resin film preferably shows a melt-flow rate (MFR) of from 0.1-200 g/10 minutes, more preferably from 0.5 to 50 g/10 minutes, at a temperature of 230 degrees Celsius under loading of 21.18N. By using the polypropylene-base resin showing MFR falling within the above range, it is possible to prepare uniform films without applying much burden to the extruder.

The polypropylene-base resin may be prepared by polymerization of propylene alone or co-polymerization of propylene with other monomer(s) in presence of a known polymerization catalyst. Examples of the known polymerization catalyst which can be used include Ti—Mg catalytic systems consisting of a solid catalyst containing magnesium, titanium and halogen atoms as essential ingredients; catalytic systems formed of any combination of a solid catalyst, containing magnesium, titanium and halogen atoms as essential ingredients, an organic aluminum compound(s) and, if desired, the third ingredient such as electron-releasing compounds; and methallocene catalytic systems.

Among these catalytic systems, any combinations of a solid catalyst, containing magnesium, titanium and halogen atoms as essential ingredients, an organic aluminum compound(s) and the third ingredient such as electron-releasing compounds are preferable. Examples of the organic aluminum compound include triethyl aluminum, triisobutyl aluminum, any mixtures of triethyl aluminum and aluminum chloride, and tetraethyl almoxane; and examples of the electron-releasing compound include cyclohexylethyldimethoxy silane, tert-butylpropyldimethoxy silane, tert-butylethyldimethoxy silane and dicyclopentyldimethoxy silane.

Examples of the solid catalyst, containing magnesium, titanium and halogen atoms as essential ingredients, include catalytic systems described in JP-A-61-218606, 61-287904 and 7-216017; and examples of the methallocene catalyst include the catalytic systems described in Japanese Patent Nos. 2587251, 2627669 and 2668732.

The polypropylene-base resin may be prepared according to any method. For example, the polypropylene-base resin may be prepared according to a solution polymerization method employing an inert solvent such as hydrocarbons including hexane, heptane, octane, decane, cyclohexane, benzene, toluene and xylene; a bulk polymerization method employing any liquid form monomer(s) as solvent; or a gas-phase polymerization method polymerizing any gaseous monomer(s). The polymerization may be carried out in the batch or continuous style.

The stereoregularity of the polypropylene-base resin may be isotactic, syndiotactic or atactic. In the invention, using the syndiotactic or isotactic polypropylene-base resin is preferable in terms of heat-resistance and crystallinity in the polymer.

In the invention, the retardation film containing the polypropylene-base resin(s) as a major ingredient is preferably used. The film may contain at least one additive selected from various additives so far as the effect of the invention is not lowered. Examples of the additive include antioxidants, UV-absorbents, antistatic agents, lubricant agents, agents capable of forming nuclear grains, antifogging additives, anti-blocking additives. Examples of the antioxidant, which can be used in the invention, include phenolic antioxidants, phosphorous antioxidants, sulfur antioxidants and hindered amine light stabilizers. Hybrid-type antioxidants such as antioxidants having both units capable of functioning as a phenolic antioxidant and as a phosphorous oxidant in the molecule can be also used. Examples of the UV absorbent, which can be used in the invention, include the agents capable of absorbing UV light such as 2-hydroxybenzophenones and hydroxyphenylbenzotriazoles; and agents capable of blocking UV light such as benzoates. The antistatic agent may be selected from the polymer-, oligomer- or monomer-type antistatic agents. Examples of the lubricant agent, which can be used in the invention, include higher fatty acid amides such as erucic acid amide and oleic acid amide; and higher fatty acids and the salts thereof such as stearic acid. Examples of the agent capable of forming nuclear grains include sorbitol-type agents capable of forming agents, organic phosphoric acid-type agents capable of forming agents and polymer-type agents capable of forming agents such as polyvinyl cycloalkanes. The anti-blocking agent may be selected from spherical or nearly spherical inorganic and organic particles. The additives may be used in combination.

The polypropylene-base resin may be formed into a film-shape according to any method (hereinunder, a film subjected to a film-forming treatment is referred to as "a raw film"). The raw film is transparent and having no retardation in plane. For example, the raw film may be prepared according to the melting method extruding the melt polymer or according to the solution method casting solution prepared by dissolving the polymer in organic solvent on a plate and then removing the solvent therefrom. In this way, a polypropylene-base resin raw film having no retardation in plane may be prepared.

One example of the process for preparing the raw film according to the melting method is as follows. A polypropylene-base resin is melt-mixed by rotation of the screw in an extruder, and then extruded from the T-die in a film-shape. The temperature of the extruded melt sheet may be from 180 to 300 degrees Celsius. When the temperature of the sheet at the time is lower than 180 degrees Celsius, extensibility may be not sufficient, thereby causing uniformity in the thickness or in retardation of the film. On the other hand, when the temperature of the sheet at the time is higher than 300 degrees Celsius, degradation and decomposition of the resin may be easily caused, thereby forming air bubbles or hydrocarbons in the sheet. The extruder may be selected from any uniaxial or biaxial extruders. For example, regarding the uniaxial extruder, it may be preferable to use the uniaxial extruder having an L/D value, which is a ratio of screw length L and diameter D, of 24 to 36 or around, and having a compression ratio, which is a ratio of the spatial volume of thread groove in a resin feeder unit and the spatial volume of thread groove in a resin weighing unit (former/latter), of 1.5 to 4 or around, and having a screw of the full-flight-type, barrier-type, or a type having a Maddock-type kneader element. From the viewpoint of suppressing degradation or decomposition of the polypropylene-base resin, and thereby ensuring uniform kneading under fusion, a barrier-type screw having an L/D value of 28 to 36 and a compression ratio of 2.5 to 3.5 may preferably be used. In addition, in order to suppress the degradation or decomposition of the polypropylene-base resin as possible, an atmosphere in the extruder may preferably be conditioned as a nitrogen atmosphere or vacuum. In order to eliminate volatile gas produced in the process of degradation or decomposition of the polypropylene-base resin, it may be still also preferable to provide an orifice of 1 mm or larger and 5 mm or smaller in diameter at the end of the extruder, to thereby increase the resin pressure at the end portion of the extruder. Increase in the resin pressure at the end portion of the extruder provided with the orifice means increase in the back pressure at the end portion, and thereby stability in the extrusion may be improved. The diameter of the orifice adopted herein is preferably 2 mm or larger and 4 mm or smaller.

The T-die to be used for the extrusion may preferably have no tiny irregularity in height or flaw on the surface of passageway of the resin, the lip portion thereof may preferably be plated or coated with a material having a small friction coefficient with respect to the molten polypropylene-base resin, and the lip end may preferably have a sharp edge shape ground to as small as 0.3 mm or smaller in diameter. The material having small friction coefficient may be exemplified by specialized plated film made of tungsten carbide-base material or fluorine-containing material. By using such T-die, not only die build-up but also die line may be suppressed at the same time, so that the resin film may be obtained with an excellent uniformity in the appearance. The T-die preferably has a coat-hanger-like manifold, and preferably satisfies the condition (1) or (2) below, and more preferably satisfies the condition (3) or (4) below:

If the lip width of T-die is smaller than 1500 mm:
length in thickness direction of T-die>180 mm (1)

If the lip width of T-die is 1500 mm or larger: length
in thickness direction of T-die>220 mm (2)

If the lip width of T-die is smaller than 1500 mm:
length in height direction of T-die>250 mm (3)

If the lip width of T-die is 1500 mm or larger: length
in height direction of T-die>280 mm (4)

By using the T-die satisfying these conditions, flow of the molten polypropylene-base resin in the T-die may properly be controlled, and the resin may be extruded at the lip portion while being suppressed in variation in the thickness, so that the resultant raw film may be more excellent in the accuracy of thickness, and may be more uniform in retardation.

From the viewpoint of suppressing fluctuation in extrusion of the polypropylene-base resin, a gear pump may preferably be attached between the extruder and the T-die. In addition, a leaf disc filter may preferably be attached, in order to remove foreign matters which reside in the polypropylene-base resin.

The molten sheet extruded from the T-die may be nipped between a metal-made cooling roll (also referred to as a chiller roll or casting roll), and a touch roll containing an elastic component which rotates while being brought into contact under pressure with the circumference of the metal-made cooling roll, and cooled and solidified to give a desired film. The touch roll to be used herein may be such as being composed of an elastic member, such as rubber, which directly configures the surface thereof, or may be such as having an elastic member roll covered with an outer cylinder composed of a metal sleeve. For the case where the elastic member roll covered with the outer cylinder composed of a metal sleeve is used as a touch roll, the molten sheet of polypropylene-base resin is generally cooled while being directly nipped between the metal-made cooling roll and the touch roll. On the other hand, for the case where the roll having the surface thereof composed of an elastic member is used as a touch roll, the molten sheet of polypropylene-base resin may be nipped while placing a bidirectionally stretched film of a thermoplastic resin between the molten film and the touch roll.

When the molten sheet of polypropylene-base resin is cooled and solidified while being nipped between the above-described cooling roll and the touch roll, the cooling roll and the touch roll are necessarily be lowered in the surface temperature, so as to rapidly cool the molten sheet. More specifically, the surface temperatures of both rolls may be adjusted to the range from 0 degree Celsius to 30 degrees Celsius. If the surface temperatures of those exceed 30 degrees Celsius, the molten sheet may need a longer time for cooling and solidification, so that crystallizable component in the polypropylene-base resin may grow, to thereby degrade the transparency of the obtained film. The surface temperatures of the rolls are preferably adjusted to lower than 30 degrees Celsius, and more preferably lower than 25 degrees Celsius. On the other hand, if the surface temperatures of the rolls are lower than 0 degree Celsius, the metal-made cooling roll may catch dew to produce water drops on the surface thereof, which tends to degrade the appearance of the film.

Since the surface condition of the metal-made cooling roll adopted herein is transferred onto the surface of the polypropylene-base resin film, so that any irregularities on the surface may degrade the accuracy of thickness of the obtained polypropylene-base resin film. Therefore, the surface of the metal-made cooling roll is preferably specular as possible. More specifically, the surface roughness of the metal-made cooling roll is preferably 0.3 S or smaller, and more preferably 0.1 S to 0.2 S, when expressed by a preferred number of maximum height.

The touch roll, which forms the portion of nipping together with the metal-made cooling roll, preferably has a surface hardness of the elastic component of 65 to 80, and more preferably 70 to 80, which is measured according to a spring-type hardness test (type A) specified by JIS K6301. By using the rubber roll having this level of surface hardness, the line pressure applied to the molten sheet may more readily be kept constant, and thereby the film-making may be facilitated without producing a bank (resin deposit) of the molten sheet between the metal-made cooling roll and the touch roll.

The pressure (line pressure) applied when the molten sheet is nipped is determined by the pressure of the touch roll pressed onto the metal-made cooling roll. The line pressure is preferably adjusted to the range from 50 N/cm to 300 N/cm, and more preferably to the range from 100 N/cm to 250 N/cm. By adjusting the line pressure to the above-described ranges, the polypropylene-base resin film may more readily be produced while keeping a constant line pressure without forming the bank.

As described above, a biaxially-stretched film of thermoplastic resin may be pinched together with the molten sheet of polypropylene-base resin between the metal-made cooling roll and the touch roll. The thermoplastic resin, which is a material of the biaxially-stretched film, may be selected from those which don't tightly fuse with the polypropylene-base resin, and examples such a thermoplastic resin include polyester, polyamide, polyvinyl chloride, polyvinyl alcohol, ethylene-vinyl alcohol copolymer and polyacrylonitrile. Among these, polyester, less causative of dimensional changes depending on humidity and temperature, is most preferable. The thickness of the biaxially-stretched film to be used is generally 5 to 50 micro meters or around, and preferably 10 to 30 micro meters or around.

In this method, the distance (air gap) between the lip of the T-die and the position where the film is nipped between the metal-made cooling roll and the touch roll is preferably equal to or less than 200 mm, and more preferably equal to or less than 160 mm. The molten sheet extruded from the T-die may be stretched while being fed from the lip to the rolls, which may more readily align the molecules in the sheet. By setting the air gap to a small value as described in the above, a raw film having a smaller degree of alignment may be obtained. The lower limit value of the air gap is determined by the diameters of the metal-made cooling roll and the touch roll adopted herein, and by the aeometry of the end of the lip adopted herein, and is generally set to 50 mm or larger.

The process speed in the manufacture of the polypropylene-base resin film according to this method is determined by the time necessary for cooling and solidifying the molten sheet. As the diameter of the metal-made cooling roll adopted herein increases, the length of contact between the molten sheet and the cooling roll increases, and thereby the manufacturing may be proceeded at higher speeds. More specifically, if a metal-made cooling roll of 600 mm in diameter is used, the process speed may be raised to as high as 5 to 20 m/min at maximum.

The molten sheet nipped between the metal-made cooling roll and the touch roll is cooled and solidified upon contact with the roll. The sheet is slit at the edges if necessary, and then winded up by a winder to give a wind-up film. In this process, for the purpose of protecting the surface of the film until it is practically used, the film may be winded up together with surface protective film(s) which is composed of another thermoplastic resin, bonded to one surface or both surfaces thereof. For the case where the molten sheet of polypropylene-base resin is nipped together with the biaxially-stretched film of thermoplastic resin between the metal-made cooling roll and the touch roll, the biaxially-stretched film may be used as one surface protective film.

The raw film produced according to the above-described method may directly be used as the retardation film, or may be used as the retardation film after any one process, or two or more processes described below.

<<Stretching>>

The raw film may be stretched for developing retardation. A film subjected to biaxial stretching process, which shows biaxial birefringence, may be used as the retardation film. The stretching ratios in the machine direction (MD) and the transverse direction (TD) may be decided depending on retardation to be desired. The stretching ratio in one of the two directions that the optical axis is found (that is, the direction, in which stretching with a larger stretching ratio is performed, becomes a direction along the slow axis) may fall within the range from 1.1 to 10; and the stretching ratio in another direction, which is orthogonal thereto (that is, the direction, in which stretching with a smaller stretching ratio is performed, becomes a direction along the fast axis) may fall within the range from 1.1 to 7. Any stretching treatment causing the optical axis along the transverse direction or the machine direction may be used.

<<Adhesion-Facilitating Treatment>>

The surface of the above-described film to be used as the retardation film is preferably subjected to an adhesion-facilitating treatment, in order to improve adhesiveness with an optically anisotropic layer formed thereon, or with an alignment film optionally formed thereon. By this treatment, the retardation film and the optically anisotropic layer may be less likely to separate from each other, even if exposed to high temperature and high humidity, and is thereby improved in the heat resistance. The adhesion-facilitating treatment is preferably corona discharge treatment or atmospheric-pressure plasma treatment. Although, generally, a corona discharge treatment may be classified into an atmospheric-pressure plasma in a broad sense, it is defined in this description as follows. A treatment, which is carried out by directly exposing a sample to a plasma region generated by corona discharge, is referred to as corona discharge treatment, and a treatment, which is carried out by placing a sample apart from a plasma region, is referred to as atmospheric-pressure plasma treatment. The corona treatment is advantageous in that it is well proven in the industrial applications at low cost, but is disadvantageous in that the surface of the sample may physically be damaged to a larger degree. On the other hand, the atmospheric-pressure plasma treatment is advantageous in that the surface of the sample may be damaged only to a smaller degree and thereby the intensity of treatment may be set to a relatively larger degree, although it has been proven only in a relatively limited number of applications, and the cost thereof is higher than that of the corona discharge treatment. Accordingly, more preferable one of the both may be selected, taking trade-off between the damage of the polymer film adopted herein and the level of improvement in the adhesiveness after the treatment, into consideration.

The surface of the film subjected to these treatments is hydrophilized. Contact angle of water on the treated surface may be adoptable as an index of hydrophilization. More specifically, the contact angle of water is preferably 55 degrees or smaller, and more preferably 50 degrees or smaller. If the contact angle of water on the treated surface is adjusted to the above-described ranges, the surface may be improved in the adhesiveness with an optically anisotropic layer or alignment film formed thereon, and may be made less causative of failures such as separation. The lower limit value is not specifically limited, so far as the value is set so as not to damage the polymer film. The contact angle may be measured according to JIS R3257 (1999). Conditions for the corona discharge treatment and atmospheric-pressure plasma treatment may be determined so as to make the contact angle fall in the above-described ranges. Conditions variable in both methods may include applied voltage, frequency, atmospheric gas species, treatment time, and so forth.

Details for these treatments are given in "Kobunshi Hyomen Kaisitsu (Polymer Surface Modification)", published by Kindai Publishing Company), p.88-; "Kobunshi Hyomen no Kiso to Oyo (Basics and Applications of Polymer Surface)", Part II, published by Kagaku Dojin Publishing Company, Inc., p. 31-; and "Taikiatsu Purazuma no Genri.cndot.Tokucho to Kobunshi Firumu.cndot.Garasu Kiban no Hyomen Kaishitsu Gijutsu (Principles and Features of Atmospheric-Pressure Plasma, and Surface Modification Techniques of Polymer Films and Glass Substrates)", published by Technical Information Institute Co., Ltd., and can be referred to.

<<Dust Removal Treatment>>

The surface of the film, in particular the surface subjected to the corona discharge treatment or atmospheric-pressure plasma treatment (occasionally it is referred to as "treated surface", hereinafter), may preferably be subjected to a dust removal treatment, before any layer is formed thereon. Methods of dust removal are not specifically limited. A dust removal treatment employing ultrasonic wave is preferable. The ultrasonic dust removal is described in detail in Japanese Laid-Open Patent Publication No. 7-333613, which can be used in the invention.

For the case where the alignment film described later is formed, the dust removal treatment is preferably carried out also to the rubbed surface of the alignment film.

<<Swelling Treatment>>

A coating liquid may be applied to the surface of the film to form a layer. In such a case, if the film is swelled to a certain degree by the solvent contained in the coating liquid, the adhesiveness between the film and the layer may be improved. More specifically, the adhesiveness may be improved without causing whitening of the coated layer, by using a solvent prepared by mixing a solvent capable of swelling the film and another solvent incapable of swelling the film in a certain ratio.

Various methods may be used for producing the retardation film constituting the rear-side or front-side retardation region. For example, a solution casting method, melt-extrusion method, calendar method or condensing forming method may be used. Among these, a solution casting method and melt-extrusion method are preferable. And the retardation film constituting the second retardation region may be a film prepared by being subjected to a stretching treatment after forming. Stretching the film may be carried out according to a uniaxially or biaxially stretching method. Simultaneously- or successively-biaxially stretching is preferable. For achieving high optical anisotropy, a film should be subjected to a stretching treatment by a high stretching ratio. For example, the film is preferably subjected to a stretching treatment in both of the width direction and the lengthwise direction (machine direction). The stretching ratio is preferably from 3 to 100%. The stretching treatment may be carried out by using a tenter. Or the longitudinally stretching treatment may be carried out between the rolls.

The retardation film constituting the rear-side or front-side retardation region may be a layer formed of a liquid crystal composition fixed in a desired alignment state, or a lamination containing such a layer and a polymer film supporting the layer. In the latter embodiment, the polymer film may be used as a protective film of the polarizing element. Examples of the liquid crystal which can be used for preparing the retardation film constituting the front-side retardation region include rod-like liquid crystals, discotic liquid crystals and cholesteric liquid crystals.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a delivery valve (geeser) for casting, then peeled off from the support at an appropriate time, and then dried to form a film.

According to a solution successive-casting method, at first, a dope of the first layer is extruded from a delivery valve for casting to be cast on a support; and, after being dried or not being dried, then a dope for the second layer is extruded from the delivery valve for casting to be cast on the first layer. And if necessary, the three or more dopes are successively cast and laminated in this manner, then removed from the support at the appropriate time, and dried to form a film.

According to a coating method, generally, a core layer is prepared according to a solution casting method. And then, a prepared coating liquid is applied to the surfaces of the core layer respectively or simultaneously by using an appropriate apparatus and dried to form a layered film.

For reducing unevenness at the corner-side, it is necessary to reduce the deformation of the retardation film caused by external force to be applied to the film. The thickness of the retardation film disposed at the rear-side, constituting the second retardation region is preferably equal to or more than 20 micro meters and equal to or less than 200 micro meters, in terms of reducing unevenness at the corner-side and improving the productivity. Details regarding unevenness at the corner-side are described in JP-A 2009-69720.

2. Polarizing Element

The polarizing element disposed at the front-side or rear-side is not limited. Any normal linear polarizing film can be used. The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

3. Protective Film

To the both surfaces of the front-side or rear-side polarizing element, a protective film is preferably bonded. Each of the protective films disposed at the liquid crystal cell side constitutes a part of the rear-side or front-side retardation regions, and the former is required to satisfy the above formula (I). The latter constitutes a part of the front-side retardation region, and in some embodiments, it is required to exhibit the optical properties, which can contribute to improving the viewing angle CR, alone or in combination with other layer(s).

The protective film disposed on the outside of the front-side or rear-side polarizing element is especially not limited. Any polymer films may be used. Examples of the film are same as those which are exemplified above as examples of the retardation film constituting the first retardation region. For example, films containing cellulose acylate (e.g., cellulose acetate, cellulose propionate and cellulose butyrate), polyolefin (e.g., norbornene-base polymer, and polypropylene), poly(meth)acrylic acid ester (e.g., polymethylmethacrylate), polycarbonate, polyester or polysulfones as a major ingredient are exemplified. Commercially available polymer films (e.g., regarding cellulose acylate film, "TD80UL" (manufactured by FUJIFILM), and regarding norbornene-base polymer film, ARTON (manufactured by JSR) and ZEONOR (manufactured by NIPPON ZEON)) can be also used.

EXAMPLES

The invention is described in more detail with reference to the following Examples. In the following Examples, an amount of the material, reagent and substance used, their ratio, the operation with them and the like may be suitably modified or changed not overstepping the sprit and the scope of the invention. Accordingly, the scope of the invention should not be limited to the following Examples.

1. Production of Film:
(1) Preparation of Film 1:
A commercially-available cellulose acylate film, "Fujitac TD80UL" (trade name by FUJIFILM) was prepared, and this is Film 1.
(2) Production of Film 2:
(Cellulose Acylate Solution for Low-Substitution Layer)
The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (1) | 10.0 mas. pts. |
| Methylene chloride | 339.3 mas. pts. |
| Methanol | 50.7 mas. pts. |

The composition of the retardation enhancer (1) is shown in the following Table. In the following Table, EG means ethylene glycol, PG means propylene glycol, BG means butylene glycol, TPA means terephthalic acid, PA means phthalic acid, AA means adipic acid, SA means succinic acid. The retardation enhancer (1) is a non-phosphate compound, and is a compound functioning as a retardation enhancer. The terminal of the retardation enhancer (1) is blocked with an acetyl group.

| | Glycol unit | | | Dicarboxylic acid unit | | |
|---|---|---|---|---|---|---|
| Retardation enhancer | Ratio of blocking both terminal hydroxyls (%) | EG (%) | PG (%) | Averaged number of carbon atoms | TPA (mole %) | Averaged number of carbon atoms | Molecular weight |
| (1) | 100 | 25 | 75 | 2.8 | 100 | 8 | 1000 |

(Cellulose Acylate Solution for High-Substitution Layer)
The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (1) | 10.0 mas. pts. |
| Silica particles having a mean particle size of 16 nm (Aerosil R972, by Nippon Aerosil) | 0.15 mas. pts. |
| Methylene chloride | 390.1 mas. pts. |
| Methanol | 58.3 mas. pts. |

(Production of Cellulose Acylate Sample)

The two cellulose acylate solutions were cast onto a band to form thereon a core layer of Film 2 having a thickness of 26 μm from the cellulose acylate solution for low-substitution layer and to form a skin layer A and a skin layer B of Film 2 each having a thickness of 2 μm from the cellulose acylate solution for high-substitution layer. The formed film was peeled away from the band, clipped, and conveyed at a temperature of 140 degrees Celsius while the residual solvent amount was 20% relative to the total mass of the film, using a tenter. Subsequently, the film was unclipped, dried at 130 degrees Celsius for 20 minutes, and conveyed at a temperature of 180 degrees Celsius using a tenter, thereby producing a film having a thickness of 30 μm. This was used as Film 2.

The production of Film 2 was free from the problems of smoking in high-temperature treatment in the drying step, adhesion of vaporized oil to the parts of the machine to cause operation failure or adhesion thereof to film to cause surface failure of the film.

This is because the retardation enhancer (1) used in the production of Film 2 functions also as a plasticizer, and therefore, the production of Film 2 does not require existing low-molecular-weight plasticizers TPP and BDP as in the production of ordinary films.

Use of the compound having a positive birefringence such as the retardation enhancer (1) solves the above-mentioned problems, and therefore, the compound having a positive birefringence is a preferred retardation enhancer for film production.

(3) Production of Film 3:
(Cellulose Acylate Solution for Low-Substitution Layer)
The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 19.0 mas. pts. |

-continued

| | |
|---|---|
| Methylene chloride | 367.1 mas. pts. |
| Methanol | 54.8 mas. pts. |

The composition of the retardation enhancer (2) is shown in the following Table. In the following Table, EG means ethylene glycol, PG means propylene glycol, BG means butylene glycol, TPA means terephthalic acid, PA means phthalic acid, AA means adipic acid, SA means succinic acid. The retardation enhancer (2) is a non-phosphate compound, and is a compound functioning as a retardation enhancer. The terminal of the retardation enhancer (2) is blocked with an acetyl group.

| | Glycol unit | | | Dicarboxylic acid unit | | | |
|---|---|---|---|---|---|---|---|
| Retardation enhancer | Ratio of blocking both terminal hydroxyls (%) | EG (%) | PG (%) | Averaged number of carbon atoms | TPA (mole %) | SA (mole %) | Averaged number of carbon atoms | Molecular weight |
| (2) | 100 | 50 | 50 | 2.5 | 55 | 45 | 6.2 | 730 |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 19.0 mas. pts. |

The composition of the retardation enhancer (3) is shown in the following Table. In the following Table, EG means ethylene glycol, PG means propylene glycol, BG means butylene glycol, TPA means terephthalic acid, PA means phthalic acid, AA means adipic acid, SA means succinic acid. The retardation enhancer (3) is a non-phosphate compound, and is a compound functioning as a retardation enhancer. The terminal of the retardation enhancer (3) is blocked with an acetyl group.

| | Glycol unit | | Dicarboxylic acid unit | | | | | |
|---|---|---|---|---|---|---|---|---|
| Retardation enhancer | Ratio of blocking both terminal hydroxyls (%) | EG (%) | Averaged number of carbon atoms | TPA (mol %) | PA (mol %) | AA (mol %) | SA (mol %) | Averaged number of carbon atoms | Molecular weight |
| (3) | 100 | 100 | 2 | 55 | 45 | 20 | 30 | 6 | 840 |

-continued

| | |
|---|---|
| Silica particles having a mean particle size of 16 nm (Aerosil R972, by Nippon Aerosil) | 0.15 mas. pts. |
| Methylene chloride | 422.0 mas. pts. |
| Methanol | 63.0 mas. pts. |

(Production of Cellulose Acylate Sample)

The two cellulose acylate solutions were cast onto a band to form thereon a core layer of Film 3 having a thickness of 51 µm from the cellulose acylate solution for low-substitution layer and to form a skin layer A and a skin layer B of Film 3 each having a thickness of 2 µm from the cellulose acylate solution for high-substitution layer. The formed film was peeled away from the band, clipped, and stretched in the transverse direction by 8% at a temperature of 140 degrees Celsius while the residual solvent amount was 20% relative to the total mass of the film, using a tenter. Next, the film was unclipped and dried at 130 degrees Celsius for 20 minutes, and then, using a tenter, this was further stretched in the transverse direction by 24% at a stretching temperature of 180 degrees Celsius, thereby giving a film having a thickness of 55 µm. This was used as Film 3.

(4) Production of Film 4:

(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (3) | 18.5 mas. pts. |
| Methylene chloride | 365.5 mas. pts. |
| Methanol | 54.6 mas. pts. |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (3) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer of Film 4 having a thickness of 41 µm from the cellulose acylate solution for low-substitution layer and to form a skin layer A and a skin layer B of Film 4 each having a thickness of 2µm from the cellulose acylate solution for high-substitution layer. The formed film was peeled away from the band, clipped, and stretched in the transverse direction by 34% at a temperature of 162 degrees Celsius while the residual solvent amount was 20% relative to the total mass of the film, using a tenter. Next, the film was unclipped and dried at 130 degrees Celsius for 20 minutes, thereby giving a film having a thickness of 45 µm. This was used as Film 4.

(5) Production of Film 5:

A cellulose acylate film having a thickness of 56 µm was produced in the same manner as that for Film 3, for which, however, the thickness of the core layer was changed from 51 µm to 52 µm and the stretching temperature in transverse stretching was changed from 180 degrees Celsius to 176 degrees Celsius. This was used as Film 5.

(6) Production of Film 6:

A cellulose acylate film having a thickness of 48 µm was produced in the same manner as that for Film 4, for which, however, the thickness of the core layer was changed from 41 µm to 44 µm, the stretching temperature in transverse stretching was changed from 162 degrees Celsius to 157 degrees Celsius, and the draw ratio in transverse stretching was changed from 34% to 32%. This was used as Film 6.

(7) Production of Film 7:

A cellulose acylate film having a thickness of 60 µm was produced in the same manner as that for Film 3, for which, however, the thickness of the core layer was changed from 51 µm to 56 µm, and the draw ratio in transverse stretching was changed from 24% to 21%. This was used as Film 7.

(8) Production of Film 8:

A cellulose acylate film having a thickness of 46 µm was produced in the same manner as that for Film 4, for which, however, the thickness of the core layer was changed from 41 µm to 42 µm, the stretching temperature in transverse stretching was changed from 162 degrees Celsius to 155 degrees Celsius, and the draw ratio in transverse stretching was changed from 34% to 31%. This was used as Film 8.

(9) Production of Film 9:

(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 17.0 mas. pts. |
| Methylene chloride | 361.8 mas. pts. |
| Methanol | 54.1 mas. pts. |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 114 µm from the cellulose acylate solution for low-substitution layer and to form a skin layer A and a skin layer B each having a thickness of 2 µm from the cellulose acylate solution for high-substitution layer. The formed film was peeled away from the band, clipped, and conveyed with a tenter at a temperature of 170 degrees Celsius while the residual solvent amount was 20% relative to the total mass of the film. Afterwards, the film was unclipped, dried at 130 degrees Celsius for 20 minutes, and then, using a tenter, stretched in the transverse direction by 23% at a stretching temperature of 180 degrees Celsius. This was used as Film 9.

(10) Production of Film 10:

(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (1) | 10.0 mas. pts. |
| Methylene chloride | 339.3 mas. pts. |
| Methanol | 50.7 mas. pts. |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (1) | 10.0 mas. pts. |
| Silica particles having a mean particle size of 16 nm (Aerosil R972, by Nippon Aerosil) | 0.15 mas. pts. |
| Methylene chloride | 390.1 mas. pts. |
| Methanol | 58.3 mas. pts. |

(Production of Cellulose Acylate Sample)

The two cellulose acylate solutions were cast onto a band to form thereon a core layer of Film 10 having a thickness of 60 µm from the cellulose acylate solution for low-substitution layer and to form a skin layer A and a skin layer B of Film 4 each having a thickness of 2 µm from the cellulose acylate solution for high-substitution layer. The formed film was peeled away from the band, clipped, and, while the residual solvent amount was 20% relative to the total mass of the film, this was stretched by 10% in the traveling direction at a temperature of 170 degrees Celsius and also in the transverse direction by 35% using a tenter. Afterwards, the film was unclipped, and dried at 130 degrees Celsius for 20 minutes. This was used as Film 10 having a thickness of 64 µm.

(11) Production of Film 11:

Cellulose acylate propionate, "CAP482-20" (by Eastman Chemical, having a degree of acetyl substitution of 0.2 and a degree of propionyl substitution of 2.4) was prepared. A plasticizer, 1,4-phenylene-tetraphenyl phosphate (8% by mass) and an antiaging agent (antioxidant), "IRGANOX-1010" (by Ciba Specialty Chemicals) (0.5% by mass) were added thereto, and mixed for 30 minutes with a tumbler mixer. The resulting mixture was dried with a moisture-removing hot air drier (Matsui Seisakusho's "DMZ2"), at a hot air temperature of 150 degrees Celsius and at a dew point of −36 degrees Celsius. Next, the mixture was fed into a double-screw extruder (by Technovel); and with adding thereto a mat agent, "AEROSIL 200V" (0.016-µm silica fine particles by Nippon Aerosil) through the additive hopper port provided in the intermediate part of the extruder via a continuous feeder so that its throughput flow could be 0.05%, and also thereto, a UV absorbent, "TINUVIN 360" (by Ciba Specialty Chemicals) through the same port to be at a throughput flow of 0.5%, the mixture was melt-extruded. Thus melt-extruded, the film formed had a thickness of 180 µm.

The film was biaxially stretched at a temperature of 142 degrees Celsius in MD by 1.1 times and in TD by 2.2 times. This film was used as Film 11. The thickness of the film was 74 µm.

In this Example, the film starting from cellulose acylate propionate was produced according to a melt extrusion method, but the same results were also obtained in solution casting (however, in consideration of the solubility thereof, cellulose acylate propionate having a degree of acetyl substitution of 1.6 and a degree of propionyl substitution of 0.9 was used).

(12) Production of Film 12:

The norbornene film built in Toshiba's liquid-crystal panel "32C7000" was peeled, and an easy-adhesion layer was formed on the surface of the film. This was used as Film 12. The thickness of the film was 70 µm.

2. Properties of Films 1 to 12:
(1) Re and Rth of Film:
The properties of Films 1 to 12 produced herein are shown in the following Table. Re(550) and Rth(550) of each film were measured as follows: A sample having a size of 30 mm×40 mm of each film was conditioned at 25 degrees Celsius and 60% RH for 2 hours, and analyzed with KOBRA 21ADH (by Oji Scientific Instruments) at a wavelength of 550 nm.

According to the same method as above, Re and Rth of the samples at a wavelength of 450 nm, 550 nm or 630 nm were determined. Films 1 to 11 all had reversed wavelength dispersion characteristics of retardation of such that both Re and Rth of the films are higher at a longer wavelength. On the other hand, Re and Rth of Film 12 were constant irrespective of the wavelength.

(2) Method for Measurement of Internal Haze of Film:
The internal haze of the film was measured as follows: Liquid paraffin was applied onto both surfaces of a film sample having a size of 40 mm×80 mm, and the sample was sandwiched between glass plates, and then analyzed in an environment at 25 degrees Celsius and 60% RH, using a haze meter (NDH-2000, by Nippon Denshoku Industry) according to JIS K-6714.

The data of liquid paraffin and glass sheets with no film sandwiched therebetween were taken as blank data.

The measured results are shown in the following Table.

|  | Thickness (μm) | Re590) (nm) | Rth590) (nm) | Internal Haze |
|---|---|---|---|---|
| Film 1 | 80 | 0.8 | 43 | 0.06 |
| Film 2 | 30 | 0.8 | 43 | 0.60 |
| Film 3 | 55 | 55 | 110 | 0.06 |
| Film 4 | 45 | 55 | 110 | 0.60 |
| Film 5 | 56 | 55 | 115 | 0.06 |
| Film 6 | 48 | 55 | 115 | 0.60 |
| Film 7 | 60 | 55 | 120 | 0.06 |
| Film 8 | 46 | 55 | 120 | 0.60 |
| Film 9 | 118 | 61 | 208 | 0.06 |
| Film 10 | 64 | 61 | 208 | 0.60 |
| Film 11 | 74 | 61 | 208 | 0.06 |
| Film 12 | 70 | 61 | 208 | 0.06 |

3. Production of Polarizing Plate:
A polyvinyl alcohol (PVA) film having a thickness of 80 μm was dyed by dipping it in an aqueous iodine solution having an iodine concentration of 0.05% by mass at 30 degrees Celsius for 60 seconds, then stretched in the machine direction by 5 times the original length while dipped in an aqueous boric acid solution having a boric acid concentration of 4% by mass for 60 seconds, and thereafter dried at 50 degrees Celsius for 4 minutes to give a polarizing film having a thickness of 20 μm.

Of the films shown in the above Table, the films containing a cellulose acylate were processed as follows: Each film was dipped in an aqueous sodium hydroxide solution (1.5 mol/liter) at 55 degrees Celsius, and then fully rinsed with water to remove sodium hydroxide. Next, this was dipped in an aqueous diluted sulfuric acid solution (0.005 mol/liter) at 35 degrees Celsius for 1 minute, and then dipped in water to fully remove the aqueous diluted sulfuric acid solution. Finally, the sample was fully dried at 120 degrees Celsius.

Any two sheets of the films (films 1 to 12) were stuck, using an adhesive, with the polarizing film sandwiched therebetween to thereby produce a polarizing plate having a protective film on both surfaces. For the cellulose acylate films, a polyvinyl alcohol adhesive was used, and for the other films, an acrylic adhesive was used to stick them to the polarizing element. The combination is shown in Table below.

In the following Table, the film marked with "*1" means a retardation film serving as a protective film for polarizer, as disposed further outside toward the panel side than the polarizing film; the film marked with "*2" means a retardation film serving as a protective film for polarizer, as disposed between the liquid-crystal cell and the polarizing film; and the film marked with "*3" means a retardation film serving as a protective film for polarizer, as disposed further outside toward the backlight side than the polarizing film.

Films 3 to 12 were so stuck that the in-plane slow axis thereof could be in parallel to the transmission axis of the polarizing element. Films 1 and 2 were so stuck that the in-plane slow axis thereof could be perpendicular to the transmission axis of the polarizing element.

4. Production and Evaluation of VA-Mode Liquid-Crystal Display Device:
(1) Preparation of VA-Mode Liquid-Crystal Cell 1:
The liquid-crystal cell of Mitsubishi's liquid-crystal panel, LCD-40MZW100 was prepared.

And of Liquid-crystal Cell 1 was measured with AXO-METRICS' AXOSCAN using the associated software, and $\Delta nd(550)$ thereof was 300 nm.

(2) Computation of the Part contrast ratio of Front-Side Substrate and Rear-Side Substrate of Liquid-Crystal Cell 1:
The part contract ratio of the rear-side substrate of the liquid-crystal cell and that of the front-side substrate thereof each means the total contrast ratio of the substrate and the parts formed on the substrate. Examples of the parts include color filter, black matrix, array part (TFT array, etc.), projections on the substrate, common electrode, slits, etc.

Liquid-crystal Cell 1 was disassembled, in which two substrates, that is, the front-side substrate and the rear-side substrate were separated, and washed with ethanol. Subsequently, the part contrast ratio of the front-side substrate (including the front-side substrate and all the parts formed on the substrate) and that of the rear-side substrate (including the rear-side substrate and all the parts formed on the substrate) were computed according to the method mentioned below.

A polarizing plate (HLC2-2518, by Sanritz) was put on the backlight of a liquid-crystal panel, Sharp's LC-32GH5, and on this, the front-side substrate or the rear-side substrate of the liquid-crystal cell fitted to a rotary stage SGSP-120YAW (by Sigma Koki) was disposed in parallel to each other at a distance of 2 mm from the polarizing plate. Briefly, these were so disposed that the TFT array wiring and the black matrix lattice pattern on the substrate could correspond to the polarization axis of the polarizing plate. Further on this, a polarizing plate, HLC2-2518 (by Sanritz) fitted to a rotary stage was disposed so that the distance between the polarizing plates could be 52 mm. Using a tester BMSA (by TOPCON) in a dark room, the brightness in the black state of display in the normal direction was measured, and the front contrast ratio A (white brightness/black brightness) was computed. In this, the polarizing plate was rotated, and the lowest brightness was the brightness in the black state. Then, the polarizing plate was rotated by 90 degrees, and the brightness in this state was the brightness in the white state.

Next, in the above embodiment, the front-side substrate or the rear-side substrate was removed, and the brightness in the black state or white state of display with the polarizing plate alone was measured, and the front contrast ratio B was computed.

Subsequently, to remove the influence of the front contrast ratio B with the polarizing plate on the front contrast ratio A, the part contrast ratio was computed according to the following formula:

Part Contrast Ratio=1/(1/front contrast ratio $A$−1/front contrast ratio $B$).

Further, the ratio of the part contrast ratio of the front substrate to the part contrast ratio of the rear-side substrate (part contrast ratio of front substrate/part contrast ratio of rear-side substrate) of Liquid-crystal Cell 1 was computed and was 1.4.

(3) Evaluation of VA-Mode Liquid-Crystal Display Device:

The produced liquid-crystal display devices were evaluated as follows:

Measurement of Front Contrast Ratio:

Using a tester BMSA (by TOPCON) in a dark room, the brightness in the black and white states in the normal direction to the panel was measured, and from the data, the front contrast ratio (white brightness/black brightness) was computed.

In this, the distance between the tester and the panel was 700 mm.

Subsequently, the front contrast ratio was computed according to the formula mentioned below, based on the front contrast ratio in a standard state.

Front Contrast Ratio= front contrast ratio in practical state/front contrast ratio in standard state.

The standard state is the liquid-crystal display device No. 5 in the following Table, which comprises one sheet of Film 5 on both the front side and the rear side. In the liquid-crystal cell used in this Example in which Δnd(550) is 300 nm and which is a two-sheet compensation system where one and the same film is disposed on both the front side and the rear side, when Re(550) of the retardation film is 55 nm and Rth(550) thereof is 115 nm or so, then the device enables good optical compensation and the viewing angle contrast is the largest. Accordingly, this is taken as the standard state here. The front contrast ratio of the liquid-crystal display device No. 5 was 4050.

The results are shown in the following Table.

compared with the liquid-crystal display device No. 2 not satisfying the formula (1), the front contrast ratio of the device No. 1 is high.

Similarly, in the liquid-crystal display devices No. 3 and No. 4, the total of $Rth_{rear}$ and $Rth_{front}$, and the total of $Hz_{rear}$ and $Hz_{fron}$ are the same. The liquid-crystal display device No. 3 satisfies the formula (1), and therefore, it is understood that, when compared with the liquid-crystal display device No. 4 not satisfying the formula (1), the front contrast ratio of the device No. 3 is high.

In the liquid-crystal display devices No. 7 and No. 6, the total of $Rth_{rear}$ and $Rth_{front}$, and the total of $Hz_{rear}$ and $Hz_{fron}$ are the same. The liquid-crystal display device No. 7 satisfies the formula (2), and therefore, it is understood that, when compared with the liquid-crystal display device No. 6 not satisfying the formula (2), the front contrast ratio of the device No. 7 is high.

In the liquid-crystal display devices No. 9 and No. 8, the total of $Rth_{rear}$ and $Rth_{front}$, and the total of $Hz_{rear}$ and $Hz_{fron}$ are the same. The liquid-crystal display device No. 9 satisfies the formula (2), and therefore, it is understood that, when compared with the liquid-crystal display device No. 8 not satisfying the formula (2), the front contrast ratio of the device No. 9 is high.

In liquid-crystal display devices Nos. 14 and 15, $Rth_{front}(\lambda)=Rth_{rear}(\lambda)$, and therefore, even though the devices satisfy $Hz_{fron}<Hz_{rear}$ and $Hz_{fron}>Hz_{rear}$, respectively, their front contrast ratio is lower than that of the devices of Examples of the invention.

| LCD No. | F-side Film *1 | F-side Film *2 (Rth, Hz) | Cell | R-side Film *2 (Rth, Hz) | R-side Film *3 | (1)/(2) *4 | Front CR |
|---|---|---|---|---|---|---|---|
| 1 | Film 1 | Film 9 (208 nm, 0.06) | Cell 1 | Film 2 (43 nm, 0.60) | Film 1 | (1) | 82% |
| 2 | Film 1 | Film 10 (208 nm, 0.60) | Cell 1 | Film 1 (43 nm, 0.60) | Film 1 | x | 72% |
| 3 | Film 1 | Film 7 (120 nm, 0.06) | Cell 1 | Film 4 (110 nm, 0.60) | Film 1 | (1) | 78% |
| 4 | Film 1 | Film 8 (120 nm, 0.60) | Cell 1 | Film 3 (110 nm, 0.60) | Film 1 | x | 76% |
| 5 (Standard) | Film 1 | Film 5 (115 nm, 0.06) | Cell 1 | Film 5 (115 nm, 0.06) | Film 1 | — | 100% |
| 6 | Film 1 | Film 3 (110 nm, 0.06) | Cell 1 | Film 8 (120 nm, 0.60) | Film 1 | x | 76% |
| 7 | Film 1 | Film 4 (110 nm, 0.60) | Cell 1 | Film 7 (120 nm, 0.06) | Film 1 | (2) | 78% |
| 8 | Film 1 | Film 1 (43 nm, 0.60) | Cell 1 | Film 10 (208 nm, 0.60) | Film 1 | x | 74% |
| 9 | Film 1 | Film 2 (43 nm, 0.60) | Cell 1 | Film 9 (208 nm, 0.06) | Film 1 | (2) | 84% |
| 10 | Film 1 | Film 11 (208 nm, 0.06) | Cell 1 | Film 2 (43 nm, 0.60) | Film 1 | (1) | 82% |
| 11 | Film 1 | Film 12 (208 nm, 0.06) | Cell 1 | Film 2 (43 nm, 0.60) | Film 1 | (1) | 82% |
| 12 | Film 1 | Film 2 (43 nm, 0.60) | Cell 1 | Film 11 (208 nm, 0.06) | Film 1 | (2) | 84% |
| 13 | Film 1 | Film 2 (43 nm, 0.60) | Cell 1 | Film 12 (208 nm, 0.06) | Film 1 | (2) | 84% |
| 14 | Film 1 | Film 5 (115 nm, 0.06) | Cell 1 | Film 6 (115 nm, 0.06) | Film 1 | x | 77% |
| 15 | Film 1 | Film 6 (115 nm, 0.06) | Cell 1 | Film 5 (115 nm, 0.06) | Film 1 | x | 77% |

*1-3: "F-side" means front-side, and "R-side" means rear-side.
*4: (1) is marked for the LCD satisfying the above formula (1); and (2) is marked for the LCD satisfying the above formula (2).

The results in the above Table confirm the following:

In the liquid-crystal display devices No. 1 and No. 2, the total of $Rth_{rear}$ and $Rth_{front}$, and the total of $Hz_{rear}$ and $Hz_{fron}$ are the same. The liquid-crystal display device No. 1 satisfies the formula (1), and therefore, it is understood that, when Next, a propylene/ethylene random copolymer containing ethylene units in an amount of about 5% by mass (Sumitomo Noblen W151 by Sumitomo Chemical) was extruded at a melt temperature of 230 degrees Celsius, using a melt extrusion shaping machine in which a T-die was built in the single-screw melt extruder, thereby giving an unprocessed film.

Subsequently, this was stretched in MD by 1.8 times and then in TD by 3.6 times in a mode of sequential biaxial stretching. Next, both the surface and the back of the film were processed for corona discharge treatment. This was used as Film 13. Film 13 has Re(550) of 55 nm, Rth(550) of 110 nm, and an internal haze of 0.6.

A liquid-crystal display device (satisfying the above formula (1)) was produced in the same manner as that for the liquid-crystal display device No. 3 in the above Table, in which, however, Film 13 was used in place of Film 4 as the inner rear-side protective film. The device was evaluated in the same manner as above. Its front contrast ratio was 78%. The result confirms that the device of this Example using a polypropylene polymer film also attained the effect of the invention.

What is claimed is:

1. A liquid-crystal display device comprising:
   a front-side polarizing element,
   a rear-side polarizing element,
   a liquid-crystal cell disposed between the front-side polarizing element and the rear-side polarizing element,
   a front-side retardation region composed of one or more retardation layers disposed between the front-side polarizing element and the liquid-crystal cell, and
   a rear-side retardation region composed of one or more retardation layers disposed between the rear-side polarizing element and the liquid-crystal cell, wherein:
   retardation along the thickness direction at a visible light wavelength $\lambda$ nm of the front-side retardation region and the rear-side retardation region, $Rth_{front}(\lambda)$ and $Rth_{rear}(\lambda)$, and the internal haze of the front-side retardation region and the rear-side retardation region, $Hz_{front}$ and $Hz_{rear}$, satisfy following formula (1) or (2):

$$Rth_{front}(\lambda) > Rth_{rear}(\lambda), \text{ and } Hz_{front} < Hz_{rear}, \quad (1)$$

$$Rth_{front}(\lambda) < Rth_{rear}(\lambda), \text{ and } Hz_{front} > Hz_{rear}. \quad (2)$$

2. The liquid-crystal display device of claim 1, satisfying formula (1).

3. The liquid-crystal display device of claim 1, satisfying formula (2).

4. The liquid-crystal display device of claim 1, wherein $Hz_{front}$ and $Hz_{rear}$ each are equal to or smaller than 0.6.

5. The liquid-crystal display device of claim 1, wherein the contrast ratio of the front-side substrate and the rear-side substrate of the liquid-crystal cell, CR(front) and CR(rear) satisfy the following formula:

$$CR(\text{rear}) \leq CR(\text{front}).$$

6. The liquid-crystal display device of claim 5, wherein the rear-side substrate of the liquid-crystal cell is an array substrate having a black matrix to partition pixels provided with a color filter layer.

7. The liquid-crystal display device of claim 1, wherein the contrast ratio of the front-side substrate and the rear-side substrate of the liquid-crystal cell, CR(front) and CR(rear) satisfy the following formula:

$$CR(\text{front}) < CR(\text{rear}).$$

8. The liquid-crystal display device of claim 7, wherein the front-side substrate of the liquid-crystal cell is an array substrate having a black matrix to partition pixels provided with a color filter layer.

9. The liquid-crystal display device of claim 1, wherein the rear-side retardation region satisfies the following formula:

$$0 \text{ nm} \leq |Rth(550)| \leq 300 \text{ nm},$$

wherein $Rth(\lambda)$ means retardation along the thickness-direction (nm) at a wavelength of $\lambda$ nm.

10. The liquid-crystal display device of claim 1, wherein the rear-side retardation region satisfies the following formula:

$$0 \text{ nm} \leq Re(550) \leq 100 \text{ nm},$$

wherein $Re(\lambda)$ means the in-plan retardation (nm) wavelength of $\lambda$ nm.

11. The liquid-crystal display device of claim 1, wherein the front-side retardation region satisfies the following formula:

$$0 \text{ nm} \leq |Rth(550)| \leq 300 \text{ nm}.$$

12. The liquid-crystal display device of claim 1, wherein the front-side retardation region satisfies the following formula:

$$0 \text{ nm} \leq Re(550) \leq 100 \text{ nm}.$$

13. The liquid-crystal display device of claim 1, wherein Rth(550) of the rear-side retardation region and/or the front-side retardation region satisfies the following two formulas:

$$|Rth(450)|/|Rth(550)| \leq 1, \text{ and}$$

$$1 \leq |Rth(630)|/|Rth(550)|.$$

14. The liquid-crystal display device of claim 1, comprising a color filter disposed inside the liquid crystal cell, wherein Rth of the color filter layer satisfies the following two formulas:

$$|Rth(450)|/|Rth(550)| \leq 1, \text{ and}$$

$$1 \leq |Rth(630)|/|Rth(550)|.$$

15. The liquid-crystal display device of claim 1, wherein the rear-side retardation region and/or the front-side retardation region is formed of a cellulose acylate film or comprises a cellulose acylate film.

16. The liquid-crystal display device of claim 1, wherein the rear-side retardation region and/or the front-side retardation region is formed of an acrylic polymer film or comprises an acrylic polymer film.

17. The liquid-crystal display device of claim 16, wherein the rear-side retardation region and/or the front-side retardation region is formed of an acrylic polymer film comprising an acrylic polymer having at least one unit selected from lactone ring units, maleic anhydride units, glutaric anhydride units and glutarimide units, or comprises the acrylic polymer film.

18. The liquid-crystal display device of claim 1, wherein the rear-side retardation region and/or the front-side retardation region is formed of a cyclic olefin polymer film or comprises a cyclic olefin polymer film.

19. The liquid-crystal display device of claim 1, wherein the rear-side retardation region and/or the front-side retardation region is formed of a polypropylene polymer film or comprises a polypropylene polymer film.

20. The liquid-crystal display device of claim 1, wherein the rear-side retardation region and/or the front-side retardation region is formed of a biaxial polymer film or comprises a biaxial polymer film.

21. The liquid-crystal display device of claim 1, wherein the rear-side retardation region and/or the front-side retardation region comprises a uniaxial polymer film.

22. The liquid-crystal display device of claim 1, having a front contrast ratio of equal to or more than 1500.

23. The liquid-crystal display device of claim 1, which comprises a backlight unit sequentially emitting independent three primary colors and which is driven according to a field sequential driving system.

24. The liquid-crystal display device of claim 1, which is a VA-mode liquid-crystal display device.

* * * * *